US006766459B2

(12) United States Patent
Shimura et al.

(10) Patent No.: US 6,766,459 B2
(45) Date of Patent: Jul. 20, 2004

(54) TIME KEEPING APPARATUS AND METHOD FOR CONTROLLING THE SAME

(75) Inventors: Noriaki Shimura, Shiojiri (JP); Hidehiro Akahane, Tatsuno-machi (JP)

(73) Assignee: Seiko Epson Corporation, Tokyo (JP)

( * ) Notice: Subject to any disclaimer, the term of this patent is extended or adjusted under 35 U.S.C. 154(b) by 577 days.

(21) Appl. No.: 09/745,968

(22) Filed: Dec. 21, 2000

(65) Prior Publication Data

US 2001/0005895 A1 Jun. 28, 2001

(30) Foreign Application Priority Data

Dec. 27, 1999 (JP) ........................................ H11-371311
Jun. 29, 2000 (JP) ........................................ 2000-196859

(51) Int. Cl.[7] .................................................. G06F 1/32
(52) U.S. Cl. .......................... 713/320; 713/324; 368/28
(58) Field of Search ................................ 713/300, 320, 713/324; 368/28, 29, 30, 203, 204

(56) References Cited

U.S. PATENT DOCUMENTS 6,067,631 A * 5/2000 Choi .......................... 713/500

FOREIGN PATENT DOCUMENTS

| | | |
|---|---|---|
| CN | 1259691 A | 7/2000 |
| EP | 0 952 500 | 10/1999 |
| EP | 1 014 227 | 6/2000 |
| JP | 56-73376 | 6/1981 |
| JP | 57-24580 | 2/1982 |
| JP | 3-218492 | 9/1991 |
| JP | 09327135 A * | 12/1997 ............. H02J/9/00 |

OTHER PUBLICATIONS

"Date and Time Synchronization Between Host and Personal Computer", IBM Technical Disclosure Bulletin, Jul. 1, 1996, US, pp. 235–236.*

* cited by examiner

*Primary Examiner*—Thomas Lee
*Assistant Examiner*—Paul Yanchus, III

(57) ABSTRACT

A time keeping apparatus has a display mode for displaying time and a power-saving mode for reducing power consumption. The time keeping apparatus has a time display unit for displaying time, a calendar display unit for displaying a present date, a control unit for stopping, in the power-saving mode, both time display by the time display unit and calendar display by the calendar display unit, and a time information storage unit for storing information relating to an elapsed time of the power-saving mode. Upon switching back to the display mode, the calendar display displays a present date on the basis of information relating to the elapsed time stored by the time information storage unit.

29 Claims, 13 Drawing Sheets

TIME KEEPING APPARATUS AND METHOD FOR CONTROLLING THE SAME

BACKGROUND OF THE INVENTION

1. Field of the Invention

The present invention relates to a time keeping apparatus and a method for controlling the same, and in particular, to a time keeping apparatus and a method for controlling the same having a function of displaying a calendar (i.e., a calendar display function).

2. Description of the Related Art

Conventionally, in order to save power consumed by power-consuming units, time keeping apparatuses are known which have, differently from a drive mode that consumes power, a power-saving mode to save power consumption, in which an operation mode is switched to the power-saving mode according to its manner of use by a user's.

As an applied technique having the foregoing mode switching function, there has been proposed a wristwatch apparatus with a function of reducing consumption of charged power, in which the apparatus operates in a display mode so that time is displayed when a user carries it or during a certain period of time after no longer being carried, and then the time display is stopped entirely or partly when being switched to a power-saving mode and a certain period of time is passed, thus saving the power consumption.

However, in the above described wristwatch apparatus, some apparatuses have a calendar display function as well as the time display function.

In such a wristwatch apparatus having the calendar display function, some apparatuses stop the calendar display function when being switched to the power-saving mode.

Such a wristwatch apparatus is configured such that it does not automatically recover the calendar display even when being switched to the time display mode from the power-saving mode. Accordingly a user manually recovers the operation.

In the wristwatch apparatus that stops the calendar display function after being swithced to the power-saving mode, there is therefore a drawback in that the operation becomes troublesome because a user has to recover the operation manually when being returned.

In addition, in wristwatch apparatus having some other calendar display function, the apparatus adopts a configuration where only the calendar display is continued even when the mode is switched to the power-saving mode.

In the case that only the calendar is continuously displayed, power is consumed even in the power-saving mode, and power saving efficiency is lowered, resulting in a drawback that an available actual drive time is shortened.

Another type of wristwatch apparatus having still some other calendar display function is configured such that the time is displayed for 72 hours (three days) after entering the non-carrying condition, then it switches to the power-saving mode. As a result, this configuration helps a user who does not carry the wristwatch apparatus on weekends (from Friday night to Monday morning) with fewer manual recovery operations of the calendar display.

In this configuration, however, the power-saving efficiency becomes lower, because power is consumed even during the non-carrying condition in which the apparatus is not used. Moreover, difficulties in the user's manual return to the calendar display are not always eliminated, though chances of such manual operations are decreased.

In order to display the calendar, it is possible to use a drive apparatus other than the apparatus used for the time display. But, a further increase in power consumption causes difficulty in that the drive apparatus for the calendar display is brought to a halt when residual energy of the power source for driving the entire time keeping apparatus is reduced to a small amount. In this case, if only the calendar display is stopped as it is, there is a possibility that a user considers that the calendar is up to date, although the calendar was actually stopped.

SUMMARY OF THE INVENTION

Thus, an object of the present invention is to provide a time keeping apparatus having a display mode and a power-saving mode for reducing power consumption and a method for controlling same, which is easy to use and provides an increase in efficiency in power saving.

In order to achieve the object, the present invention provides a time keeping apparatus having a display mode for displaying time and a power-saving mode for reducing power consumption, the time keeping apparatus comprising a time display unit for performing a time display, a calendar display unit for performing a calendar display displaying a present date, a display stopping unit for stopping, in the power-saving mode, both the time display and the calendar display, and elapsed time of the power-saving mode, wherein the calendar display unit returns an operation of the calendar display to display a present date corresponding to a present time on the basis of information relating to the elapsed time stored by the time information storage unit, when a present time recovering operation is implemented, the present time recovering operation being an operation in which the power-saving mode of stopping the calendar display is switched to the display mode.

DETAILED DESCRIPTION

A detailed description, with preferred embodiments of the present invention, is described as follows.

[1] First Embodiment

With reference to the drawings, a first embodiment of the present invention will now be described.

[1.1] General Configuration of the First Embodiment

Figure 1:
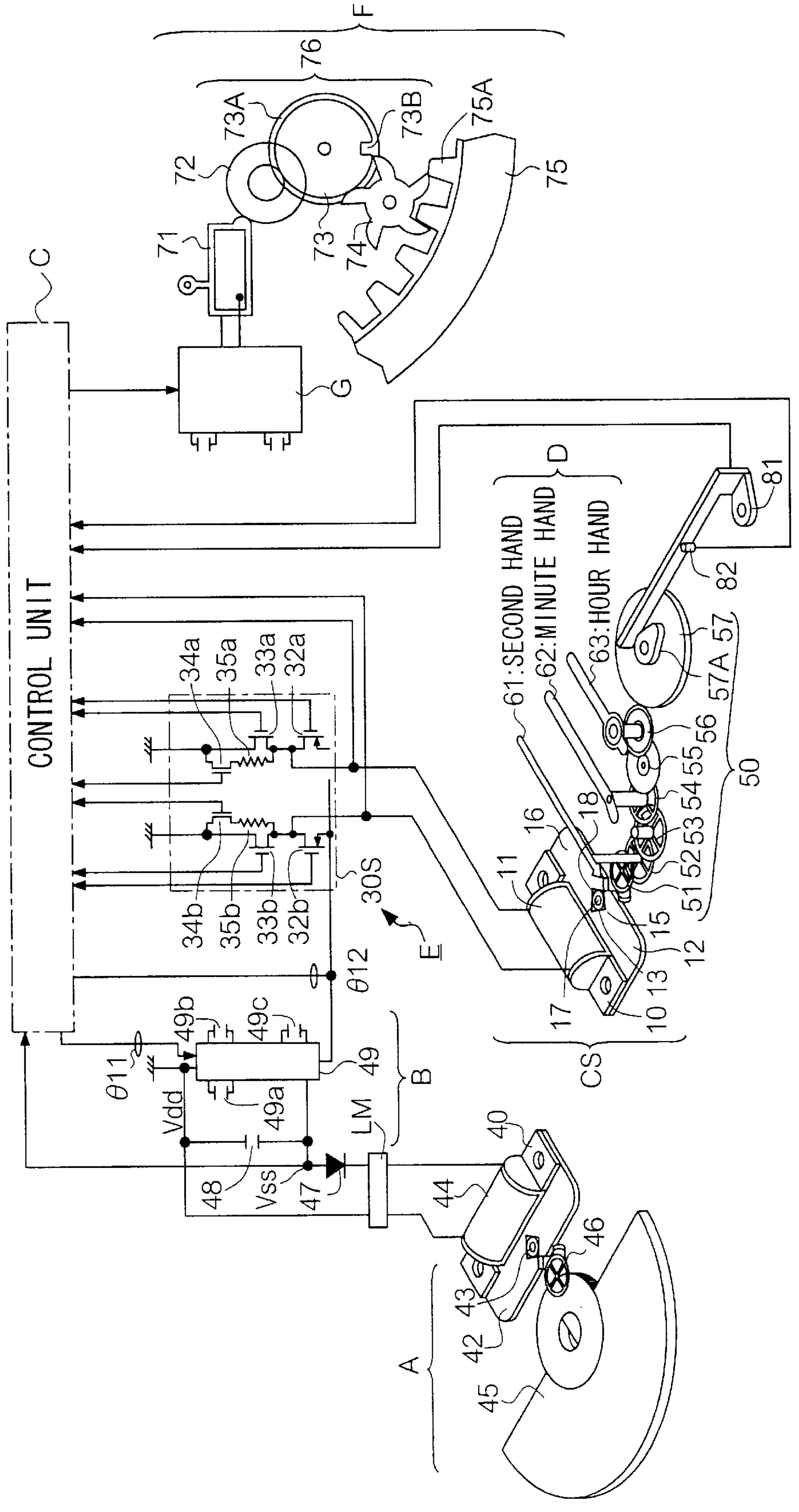
FIG. 1 shows the general configuration of a time keeping apparatus 1 according to a first embodiment of the present invention.

FIG. 1 shows a schematic configuration of a time keeping apparatus 1 according to the first embodiment of the present invention. The time keeping apparatus 1 comprises a wristwatch used by a user in such manner that a band connected to the watch body is wound around the wrist.

The time keeping apparatus 1 of the first embodiment essentially includes a power generation unit A for generating alternating power; a power source unit B for rectifying alternating voltage from the power generation unit A and charging it, and boosting the charged power to supply each component with the power; a control unit C for detecting a generated condition in the power generation unit A (a generated condition detecting unit 91 which is described later) and controlling the entire apparatus based on its detected result; a hand drive mechanism D for driving display hands (hour hand, minute hand, and second hand) with the use of a step motor 10; a hand drive unit E for driving the hand drive mechanism D based on a control signal supplied from the control unit C; a calendar mechanism F for driving a date indicator 75 by using an actuator 71, and a calendar drive unit G for driving the calendar mechanism F on the basis of a control signal from the control unit C.

The control unit C is configured such that a display mode, in which both the hand drive mechanism D and the calendar mechanism F are driven to display time, and a power-saving mode in which the power source to both the hand drive mechanism D and the calendar mechanism F is stopped to save the power are switched, depending on a generated state of the power generation unit A. The transfer from the power-saving mode to the display mode is forcibly implemented when the user shakes the time keeping apparatus 1 with his hand. Hereinafter, each component will be explained. The control unit C is explained later using a functional block.

The power generation unit A includes a generating device 40, an oscillating weight 45, and a speed increasing gear 46. As the generating device 40, an electromagnetic induction type of alternating generator is employed in which a generating rotor 43 rotates within a generating stator 42 to outwardly output the power induced along a magnet coil 44 connected with the generating stator 42. The oscillating weight 45 functions as a means for transmitting kinetic energy to the generating rotor 43. Motion of the oscillating weight 45 is transmitted to the generating rotor 43 via the speed increasing gear 46. In the wristwatch type of time keeping apparatus 1, the oscillating weight 45 can be swung within the time keeping apparatus in response to user's arm motions. Therefore, making use of the energy relating to the user's typical and ordinary movement can generate electric power, so that the time keeping apparatus 1 can be driven using the above-mentioned electric power.

The power source unit B is essentially composed of a diode 47 functioning as a rectifying circuit, a large-capacity capacitor 48, and a voltage boost/drop circuit 49. The voltage boost/drop circuit 49 uses a plurality of capacitors 49*a*, 49*b* and 49*c* to implement voltage boost and drop in multiple stages, which allows the voltage supplied to the drive unit E to be adjusted in response to a control signal Ø11 output from the control unit C. In addition, an output voltage of the voltage boost/drop circuit 49 is also supplied to the control unit C in response to a monitor signal Ø12, so that the output voltage can be monitored. In the power source unit B, Vdd (the higher voltage side) is assigned to a reference potential (GND) and Vss (the lower voltage side) is generated for use as power source voltage.

Now, the hand drive mechanism D will be described. The hand drive mechanism uses a stepping motor 10, also referred to as a pulse motor, step motor, stepped moving motor, or digital motor, that is a motor driven with a pulse signal and is used widely as actuators for digital control apparatuses. In recent years, a compact and light-weight step motor is frequently employed as an actuator for compact and portable electronic devices or information devices. Such electronic devices are represented by time keeping apparatuses such as an electronic clock, time switch, and chronograph.

The step motor 10 according to this embodiment includes a driving coil 11 generating magnetic power associated with a driving pulse supplied from the drive unit E, a stator 12 excited by the driving coil 11, and a rotor 13 rotating responsively to a magnetic field excited within the stator 12. Further, the step motor 10 is composed into a PM type (permanent magnet rotation type) of which rotor 13 is formed by a disk-like, two-pole permanent magnet. There is provided a magnetic saturation member 17 in the stator to generate different magnetic poles at individual phases (poles) 15 and 16 around the rotor 13, due to magnetic power produced by the driving coil 11. Further, in order to define directions of rotation of the rotor 13, an inner notch 18 is formed at an appropriate position in the inner circumference of the stator 12, thereby producing cogging torque to stop the rotor 13 at a proper position.

Rotation of the step motor 10 is transmitted to each hand by way of a wheel train 50 consisting of a fifth wheel & pinion 51 engaging with the rotor 13 via a pinion, a second wheel & pinion 52, a third wheel & pinion 53, a center wheel & pinion 54, a minute wheel 55, an hour wheel 56, and a 24-hours wheel 57. A second hand 61 is coupled with the axis of the second wheel & pinion 52, a minute hand 62 with the center wheel & and pinion 54, and an hour hand 63 with the hour wheel 56. Rotation of the rotor 13 is associated with movement of each hand, thereby displaying time.

The 24-hours wheel 57, which is engaged with the hour wheel 56, turns one time per twenty four hours, and separates each twenty four hour period by a cam 57A placed thereon, a switch shaft 81 and a switch pin 82 composing a normally-closed contact, which are separated when it is 24 o'clock (midnight), thus providing an open state (off state).

This permits the control unit C to detect that the present time is 24 o'clock, and then operates to update the display of a calendar.

The drive unit E provides the step motor 10 with various driving pulses under the control of the control unit C. The drive unit E has a bridge circuit composed by a p-channel MOS 33*a* and an n-channel MOS 32*a* connected in series and a p-channel MOS 33*b* and an n-channel MOS 32*b* connected in series. Moreover, the drive unit E has rotation-detecting resistors 35*a* and 35*b* each connected in parallel to each of the p-channel MOSs 33*a* and 33*b* and sampling p-channel MOSs 34*a* and 34*b* for supplying the resistors 35*a* and 35*b* with chopper pulses. Accordingly, the control unit C applies, at specific timings, to gate electrodes of those MOSs 32*a*, 32*b*, 33*a*, 33*b*, 34*a* and 34*b* control pulses of which polarities and pulse widths differ from each other, thus enabling the supply to the driving coil 11 of the driving pulses of which polarities are different from each other or a detecting pulse for exciting induced voltage to detect rotation of the rotor as well as a magnetic field thereof.

The calendar mechanism F includes an actuator 71 for driving a rotor 72 described later. The actuator has a piezoelectric element to which an alternating voltage is applied from the calendar drive unit G, thus expanding and retracting the element in the lateral directions in the figure. A rotor 72 is driven and rotated by the actuator 71. A date indicator controls Geneva wheel 73 engaging with the rotor 72 and has a flange 73A. A date wheel 75 displays a calendar; and a date indicator driving wheel 74 engages with a cam 73B formed so as to notch the flange 73A of the date indicator controlling Geneva wheel 73 and transmits a driving force of the date indicator controlling Geneva wheel 73 to the date wheel 75 via a train of teeth 75A thereof.

The calendar drive unit G includes an alternating voltage applying circuit, which is not shown, to apply an alternating voltage for driving the actuator 71 composing the calendar mechanism F under the control of the control unit C.

[1.2] Detailed Configuration of Control Unit

The configuration of the control unit C is described with reference to FIG. 2, which shows a functional block diagram illustrating the control unit C and a peripheral configuration thereof.

The control unit C includes an oscillating circuit 101 having a reference oscillator such as a crystal oscillator that outputs an oscillating signal; a dividing circuit 102 for dividing the oscillating signal output by the oscillating circuit 101 to produce a variety of clock signals; a 24-o'clock detecting device 103 for detecting whether or not displayed time reaches 24 o'clock (midnight) on the basis of open/close states of the switch shaft 81 and the switch pin 82 and to output a 24-o'clock detecting signal $S_{24H}$; a time information storage device 104 for counting the present time based on both a second clock signal $S_{CK1}$ output every one second from the dividing circuit 102 and the 24-o'clock detecting signal $S_{24H}$ given by the 24-o'clock detecting device; and a detecting circuit 105 for detecting if or not the power generation unit A is operating.

The control unit C includes a non-generation time/power-saving mode elapsed time counter 106 which counts either a non-generation time based on an output signal of the detecting circuit 105 in a display mode in which the time keeping apparatus 1 displays the present time, or a power-saving mode elapsed time in a power-saving mode in which the time keeping apparatus 1 stops the hand drive to save power consumption; and a zero (0) detecting circuit 117 which detects whether or not the power-saving elapsed time is zero in the non-generation time/power-saving mode elapsed time counter 106, more specifically, whether or not a return to the present time is completed, when an operation mode returns from the power-saving mode to the display mode.

Moreover, the control unit C includes a mode controlling unit 107 that assigns the present operation mode to the power-saving mode in cases when the operation mode is in the display mode and the detecting circuit 105 outputs a power-saving mode transferring signal to transfer to the power-saving mode due to the fact that the non-generation time exceeds a predetermined time, and on the other hand, assigns the operation mode to the display mode in cases when the present operation mode is in the power-saving mode and the detecting circuit 105 substantially detects a power generated condition.

Furthermore, the control unit C includes a selection circuit 108 which, according to a mode selecting signal SMSEL output from the mode control circuit 107, selectively outputs as a date counting signal $S_{DATE}$, the 24-o'clock detecting signal $S_{24H}$ provided by the 24-o'clock detecting unit 103 under the display mode and in addition, selectively outputs as the date counting signal $S_{DATE}$, an hour counting signal $S_{24C}$output from the time information storage unit 104 under the power-saving mode; a calendar counter 109 which counts the present date based on the date counting signal $S_{DATE}$ output from the selection circuit 108; a displayed day counter 110 for counting a displayed day that is displayed by the date wheel 75 on the basis of driven conditions of the calendar drive unit G; a coincidence circuit 111 for detecting whether or not the dates are coincident between the present date counted by the calendar counter 109 and the displayed date counted by the displayed day counter 110; and an input unit 112 through which a variety of pieces of information are inputted.

The time information storage unit 104 includes a second counter 104A for counting up the second clock signal $S_{CK1}$ so that the counts are cyclically performed from zero to 59 seconds; a minute counter 104B for counting up every one minute based on counts of the second counter 104A so that the counts are cyclically performed from zero to 59 minutes; an hour counter 104C for counting up every sixty minutes based on counts of the minute counter 104B so that the counts are cyclically performed from the zero o'clock to the 23 o'clock.

The non-generation time/power-saving mode elapsed time counter 106 includes a power-saving time counter 106A which counts a power-saving mode elapsed time with the second clock signal $S_{CK1}$ input as a count-up signal $S_{UP}$ in the power-saving mode, counts down on a count-down signal $S_{DOWN}$ from the drive unit E until the power-saving mode elapsed time becomes zero when a return is made from the power-saving mode to the display mode, and serves as part of the non-generation time counter in the display mode; and an elapsed day counter 106B which counts the number of days that have elapsed since the non-generation started on both an output signal of the detecting circuit 105 and an output signal of the power-saving time counter 106A in the display mode.

The power-saving time counter 106A includes an elapsed second counter 106C which counts up, in the power-saving mode, a power-saving time elapsed second with the second clock signal $S_{CK1}$ input as the count-up signal $S_{UP}$ and, during a transfer from the power-saving mode to the display mode, counts down the power-saving time elapsed second based on the count-down signal $S_{DOWN}$ from the drive unit E; an elapsed minute counter 106D which counts up using a carrying-over signal from the elapsed second counter 106C in the power-saving mode and counts down using a carrying-under signal from the elapsed second counter 106C during a transfer from the power-saving mode to the display mode; an elapsed hour counter 106E which counts up based on a carrying-over signal from the elapsed minute counter 106D in the power-saving mode and counts down based on a carrying-under signal from the elapsed minute counter 106D during a transfer from the power-saving mode to the display mode.

The calendar counter 109 includes a date counter 109A for counting a date of the present year, month and date based on the date counting signal $S_{DATE}$ output from the selection circuit 108, a month counter 109B for counting a month of the present year, month and date based on the carrying-over signal of the date counter 109A, and a year counter 109C for counting a year of the present year, month and date based on the carrying-over signal of the month counter 109B.

[1.3] Operation of First Mode

Figure 2:
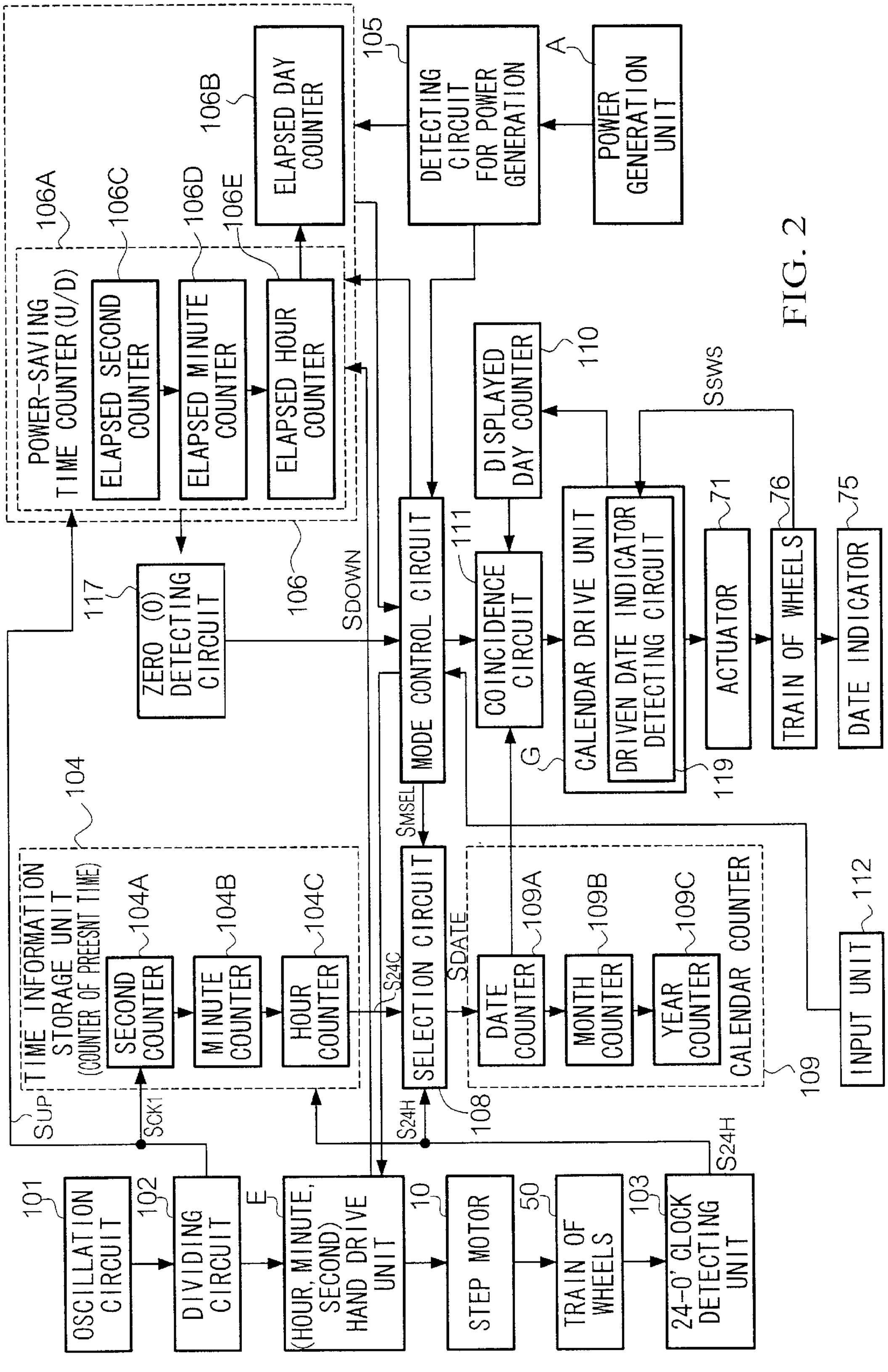
FIG. 2 is a functional block diagram showing a control unit C and its peripheral configuration according to the first embodiment.

Referring to FIGS. 1 and 2, the operation of the first embodiment is described.

[1.3.1] Operation in the Display Mode

First, an operation in the display mode is explained.

The oscillating circuit 101 of the control unit C outputs the oscillating signal to the dividing circuit 102. The dividing circuit 102 divides the oscillating output of the oscillating circuit 101 to produce the various clock signals, which are then supplied to the time information storage unit 104, the non-generation time/power-saving mode elapsed time counter 106, and the drive unit E.

Accordingly, the drive unit E drives the step motor 10, of which driving force is then transmitted through the wheel train 50 to the second hand 61, minute hand 62, and hour hand 63 to be driven for displaying time. Concurrently, when the 24-hours wheel 57 turns one time during 24 hours so that the cam 57A of the 24-hours wheel 57 displays the 24 o'clock (midnight), the switch shaft 81 and the switch pin 82 composing a normally-closed contact in the 24-o'clock detecting unit 103, are separated from each other, resulting in its open state (off state).

Responsive to this, the control unit C detects that it is 24 o'clock at present and controls the calendar drive unit G to apply an alternating voltage to the actuator 71 composing the calendar mechanism F. As a result, the actuator expands and retracts in the lateral direction in FIG. 1, so that the rotor 72 is driven in rotation.

When the rotor 72 is driven in rotation, the date indicator controlling Geneva wheel 73 engaging with the rotor 72 rotates, and when the time displays the 24 o'clock, the date indicator driving wheel engages with the cam 73B formed to notch the flange 73A of the date indicator controlling Geneva wheel 73, so that the date indicator 75 is driven to update the calendar display.

In this operation, the selection circuit 108 selectively outputs to the calendar counter 109 the 24-o'clock detecting signal $S_{24H}$ supplied, as the date counting signal $S_{DATE}$, from the 24-o'clock detecting unit 103 by using the mode selecting signal $S_{MSEL}$ from the mode control circuit 107.

The date counter 109A of the calendar counter 109, therefore, counts a day among the present year, month and day based on the operation states of the 24-o'clock detecting unit 103, thus the calendar counter 109 counts the present year, month and day on the basis of the operation states of the 24-o'clock detecting unit 103.

A count of the date counter 109A is then output to the coincidence circuit 111, in which a non-coincidence is detected in cases it does not coincide with a count of the display day counter 110 (corresponding to an displayed day of the calendar) based on a driven state of the calendar drive unit G, resulting in that the calendar drive unit G is controlled to drive the actuator 71, the date indicator is driven in rotation via the train of wheels 76, and the displayed day is made to be identical with the actual date.

The power-saving time counter 106A of the non-generation time/power-saving mode elapsed time counter 106 functions as part of the non-generation time counter, where, if the detecting circuit 105 detects that the power generation unit A is in non-generation, a duration of the non-generated state is measured by the elapsed second counter 106C, elapsed minute counter 106D, and elapsed hour counter 106E.

When the duration of the non-generated period exceeds 24 hours, the elapsed day counter 106B counts up.

The second counter 104A of the time information storage unit 104 counts up the second clock signal $S_{CK1}$ so that the counts are cyclically performed from zero to 59 seconds, a minute counter 104B counts up every one minute based on the count of the second counter 104A so that the counts are cyclically performed from zero to 59 minutes, and the hour counter 104C counts up every sixty minutes based on a count of the minute counter 104B so that the counts are cyclically performed from the zero o'clock to the 23 o'clock, thus making it possible for the time information storage unit 104 to count an hour, minute and second at the present time and store it.

In this situation, when the non-generation time which has been counted by the elapsed hour counter 106E reaches a predetermined time or the number of non-generation elapsed days which has been counted by the elapsed day counter 106B reaches a predetermined number of days, a transfer to the power-saving mode is made by means of the mode control circuit 107.

Alternatively, it is possible that a duration of the non-generation state during which the display of time is transferred from the display mode to the power-saving mode and a duration of the non-generation state during which the display of day is transferred from the display mode to the power-saving mode may be separately set. For example, the display of time can be set so as to be transferred to the power-saving mode when a duration of the non-generation state reaches 24 hours, while the display of the calendar can be set so as to be transferred to the power-saving mode when a duration of the non-generation state lasts for 31 days.

An operation of the calendar display is exemplified as to cases where residual energy of the power source, i.e., a drive source of the time keeping apparatus, becomes small.

The calendar display unit may consume electric power as much as 1 to 3 [mW] in its operation. In contrast, the time display unit (second display and hour/minute display) consumes electric power as less as approximately 500 [$\mu$W] even in its quick movements. Namely, the calendar display unit requires a larger amount of consumed power compared to that required by the time display unit.

The calendar display therefore may be transferred to the power-saving mode in such a case that the residual energy of the power source is lowered to a small amount.

More specifically, in the case that there is a correlation between residual energy of the power source and the voltage of the power source in some extent, it may be configured in such manner that there are provided a power source voltage detecting circuit to detect the voltage of the power source 48 (power source voltage), a reference voltage producing circuit to produce a reference voltage for the power source, and a voltage comparison circuit to compare a detected power source voltage with the power source reference voltage to yield a compared-result signal, in which the compared-result signal resulting from a comparison between a detected power source voltage and the power source reference voltage is fed to the mode control circuit 107.

As a result, the mode control circuit 107 causes the calendar display to transfer to the power-saving mode in cases the compared-result signal shows that the residual energy is low.

Transferring the calendar display to the power-saving mode reduces the power consumption so as to prolong a display-available time and avoids a system from being down, which is caused by a malfunction of the time keeping apparatus due to a voltage drop of the power source when the calendar display consumes power.

Even in the power-saving mode, the time information storage unit 104 continues counting the present time.

[1.3.2] Operation in the Power-saving Mode

The operation in the power-saving mode is explained as follows.

In the power-saving mode, the oscillating circuit 101 of the control unit C outputs an oscillating signal to the dividing circuit 102, which then divides the outputted oscillating signal to produce various clock signals. These signals are supplied to the time information storage unit 104, non-generation time/power-saving mode elapsed time counter 106, and drive unit E.

However, the drive unit E transfers to the power-saving mode responsive to a control signal stemming from the mode control circuit 107, and stops displaying the time. To be specific, the step motor 10 is brought to a non-driven state, so that the display of the time is stopped.

This causes the 24-hours wheel 57 to stop, and the calendar drive unit G and the calendar mechanism F are stopped as well.

On the other hand, the control of the mode control circuit 107 allows the selection circuit 108 to selectively output to the calendar counter 109 the hour counting signal $S_{24C}$ output from the time information storage unit 104, as the date counting signal $S_{DATE}$.

Accordingly, based on counted states of the time information storage unit 104, the date counter 109A of the calendar counter 109 counts a day among the present year, month and day. Thus, the calendar counter 109 counts the present year, month and day based on the counts of the time information storage unit 104.

Additionally, in the power-saving time counter 106A of the non-generation time/power-saving mode elapsed time counter 106, the elapsed second counter 106C counts up a power-saving time elapsed second in response to the second clock signal $S_{CK1}$ serving as the count-up signal $S_{UP}$. Further, the elapsed minute counter 106D counts up on a carrying-over signal from the elapsed second counter 106C, and the elapsed hour counter 106E counts up based on a carrying-over signal from the elapsed minute counter 106D.

As a result, an elapsed time of the power-saving mode is stored in the power-saving time counter 106A of the counter 106.

Figure 3:
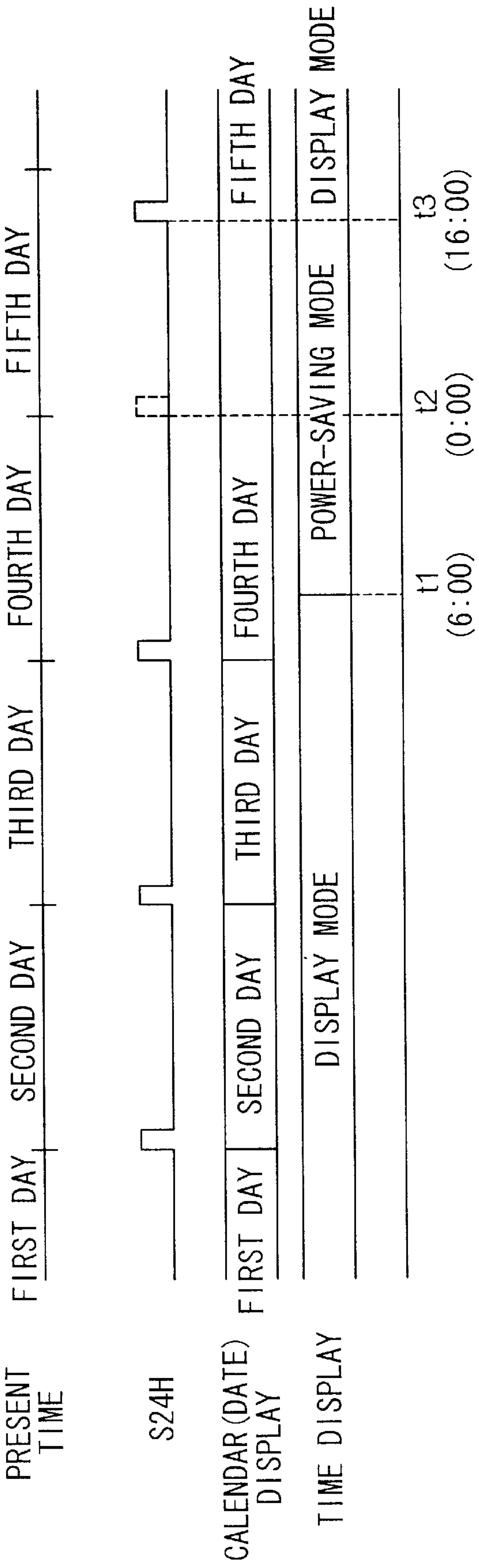
FIG. 3 is an operational illustration of the first embodiment.

A practical example is shown in FIG. 3, in which a transfer to the power-saving mode is made at time t1 (6:00 on the fourth day), and the time keeping signal $S_{24C}$ is outputted at time t2 (0:00 on the fifth day), resulting in that the date counter 109A of the calendar counter 109 is counted up, the calendar's date being added one day.

[1.3.3] Operation in the Return to the Present Time

An operation during a return to the present time is explained as follows.

When a user performs a predetermined action with the input unit 112, e.g., a user pulls a crown out from the zero-step position to the first-step pulled position, before pushing it into the zero-step position within a given period of time (for example, within one second), or, the detecting circuit 105 successively detects the generation of power above a predetermined voltage which lasts during at least a predetermined period of time in the power generation unit A, the mode control circuit 107 returns to the present time display in order to transfer its operation mode from the power-saving mode to the display mode.

In response to this, the zero detecting circuit 117 controls in a quick moving manner the second hand 61, minute hand 62, and hour hand 63 through the drive unit E and the pulse motor 10 such that a displayed time is returned to the present time.

More specifically, the drive unit E outputs the count-down signal $S_{DOWN}$ every time when it outputs a driving pulse toward the second hand 61, and counts down a count of the power-saving time counter 106A.

This causes the elapsed second counter 106C to count down based on the count-down signal $S_{DOWN}$ supplied from the drive unit E, the elapsed minute counter 106D to count down on a carrying-under signal supplied from the elapsed second counter 106C, and the elapsed hour counter 106E to count down based on a carrying-under signal coming from the elapsed minute counter 106.

The power-saving time counter 106A then supplies the counts to the zero detecting circuit 117.

Therefore, the zero detecting circuit 117 drives the second hand 61, minute hand 62, and hour hand 63 until a count of the power-saving time counter 106A reduces down to zero, that is, by amounts that correspond to an elapsed time in the power-moving mode. The time displayed at present then accurately provides the present time.

Next, in order to return the calendar display, the coincidence circuit 111 is put into operation, provided that the foregoing input actions are performed with the input device 112 or generation is detected by the detection unit A.

The coincidence circuit 111 then makes a comparison between a count of the date counter 109A and a count of the display day counter 110.

Thus, in cases where the power-saving mode has continued for one or more days, counts of the date counter 109A and display day counter 110 disagree with each other, which causes a displayed calendar to be updated by driving the actuator 71 via the calendar drive unit G, rotating the rotor 72, date indicator controlling Geneva wheel 73, and date indicator driving wheel 74 all composing the wheel train 76, thus rotating the date indicator 75.

Practically, as shown in FIG. 3, at time t3 (corresponding to 16:00 o'clock) when ten hours have passed since a transfer to the power-saving mode was made, according to

16:00−6:00=10:00, the time is put forward ten hours to return to the present time and the calendar is driven one day correspondingly to the time keeping signal $S_{24C}$ that occurred in the power-saving mode to make the calendar display "the fifth day."

When counts of both date counter 109A and display day counter 110 become equal to each other, the coincidence circuit 111 determines that the calendar display is returned, and stops driving the calendar drive unit G.

The mode control circuit 107 then controls the selection circuit 108 based on the mode selecting signal $S_{MSEL}$ so that the circuit 108 selectively outputs to the calendar counter 109 the 24-o'clock detecting signal $S_{24H}$, as the date counting signal $S_{DATE}$, output from the 24-o'clock detecting unit 103.

In this case, when residual energy of the power source, which is a driving source of the time keeping apparatus, becomes too low, it is possible to provide a configuration where the return of the calendar display is not carried out. For adopting such a configuration, it is enough that the date counter 109A continues counting on the basis of the date counting signal $S_{DATE}$, during which time the return is performed at time when the residual energy of the power source has been restored again to a sufficient level due to exchanging batteries, charging, etc.

Practically, in the case that a certain degree of correlation exists between the residual energy of the power source and the power source voltage, a compared-result signal, which is obtained by comparing a detected power source voltage with the power source reference voltage, is supplied to the mode control circuit 107.

The mode control circuit 107, therefore, performs no recovery operation of the calendar display in cases where the compared-result signal represents a small amount of the residual energy.

As a result, when the residual energy is small, the calendar display will not be returned, which practically minimizes power consumption to prolong a display-available interval of the time and avoids the system from being down, which is caused by a malfunction of the time keeping apparatus on account of a dropped power source voltage in returning the calendar display.

[1.3.4] Detection of Driving Amount of Date Indicator

Detection of a driving amount of the date indicator is described as follows.

In the present first mode, in order to detect how many days the date indicator 75 is driven, i.e., a driving amount of the date indicator, a driven date indicator detecting circuit 119 is provided in the calendar drive unit G (refer to FIG. 2).

Figure 4:
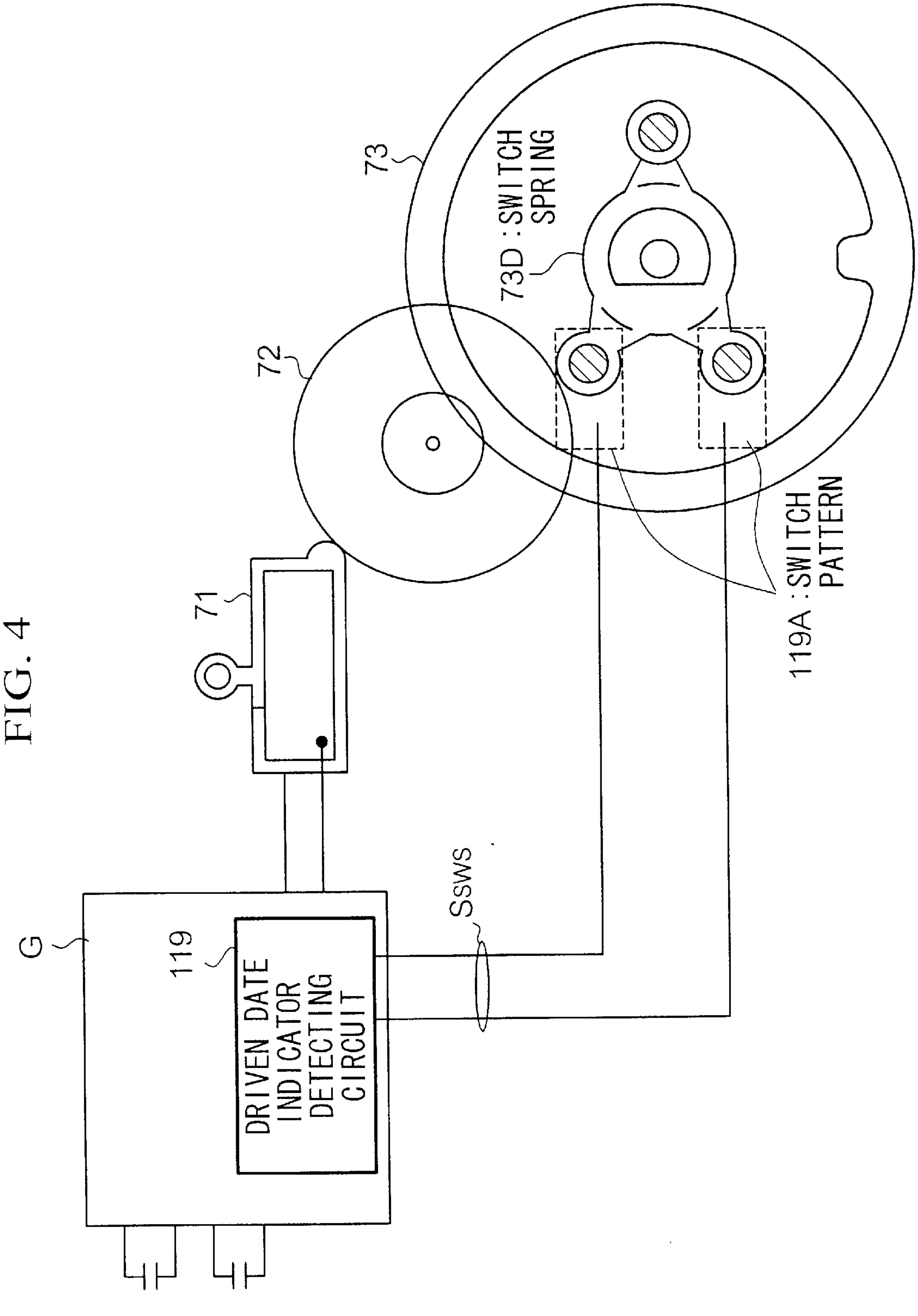
FIG. 4 is a schematic diagram showing a date indicator controlling Geneva wheel and the vicinity thereof and a calendar drive unit.

FIG. 4 shows a schematic diagram of the date indicator controlling Geneva wheel 73 and connecting units, and the calendar drive unit G.

As shown in FIG. 4, in the date indicator controlling Geneva wheel 73, there is provided a switch spring 73D that rotates together with the wheel 73.

In contrast, the driven date indicator detecting circuit 119 has a switch pattern 119A, in which, in cases where the switch spring 73D realizes a state shown in FIG. 4, that is, the date indicator 75 is located at a static stabilized position (i.e., a position at which a drive of the date indicator will not be performed), the switch spring 73D contacts the switch pattern 119A to be short-circuited electrically, thus a switch pattern short signal $S_{SWS}$ is input into the driven date indicator detecting circuit 119.

In other words, with the switch pattern short signal $S_{SWS}$ inputted, the switch pattern 119A is in an electric short-circuited state, showing that the date indicator 75 is located at the static stabilized position (i.e., a position at which a drive of the date indicator will not be performed).

Accordingly, when the date indicator 75 is driven indirectly by the actuator 71, the switch pattern 119A is transferred from a short-circuited state, to an open state, and to a short-circuited state. The driven date indicator detecting circuit 119 can therefore detect that a day driving has been performed by sensing transfers 3 from an input, to a non-input, and to an input of the switch pattern short signal $S_{SWS}$.

In this case, since the driven date indicator detecting circuit 119A consumes a large amount of power if the switch pattern 119A is always in the short-circuited state, it is preferred to employ the following configuration in terms of lowering power consumption.

That is, it is preferred to employ configurations, such as:

(1) after the switch pattern 119A is in the short-circuited state, it is again transferred by driving the actuator 71 to a position at which the open state of the switch pattern is established; or (2) in cases the date indicator 75 is located at a static stabilized position, the switch pattern 119A is in the open state, while the indicator is located at any other position, the pattern is in the short-circuited state.

[1.4] Effect of the First Embodiment

As described above, according to the first embodiment, during the display mode, the calendar is displayed based on the operations of the 24-o'clock detecting unit interlocking with the hand drives. During the display mode, in the case where a non-generation state (initiated either through the input unit or at the power generation unit) continues for at least a predetermined period of time, a transfer to the power-saving mode is made and the hand drives are stopped. Moreover, during the power-saving mode, the calendar counter to return to the calendar display is controlled in correspondence with an elapsed time of the power-saving mode. When returning the operation, the calendar can return its displays on the basis of a count of the calendar counter.

Therefore, with improved ease of use, power-saving efficiency can be improved and a driving duration of the time keeping apparatus can be prolonged effectively.

[2] Second Embodiment

A second embodiment of the present invention is described as follows.

[2.1] Configuration of Second Embodiment

A time keeping apparatus according to a second embodiment of the present invention is similar in its schematic configuration to that according to the first embodiment. Thus, detailed explanations of the time keeping apparatus of this embodiment with reference to FIG. 1 are not repeated here.

Figure 5:
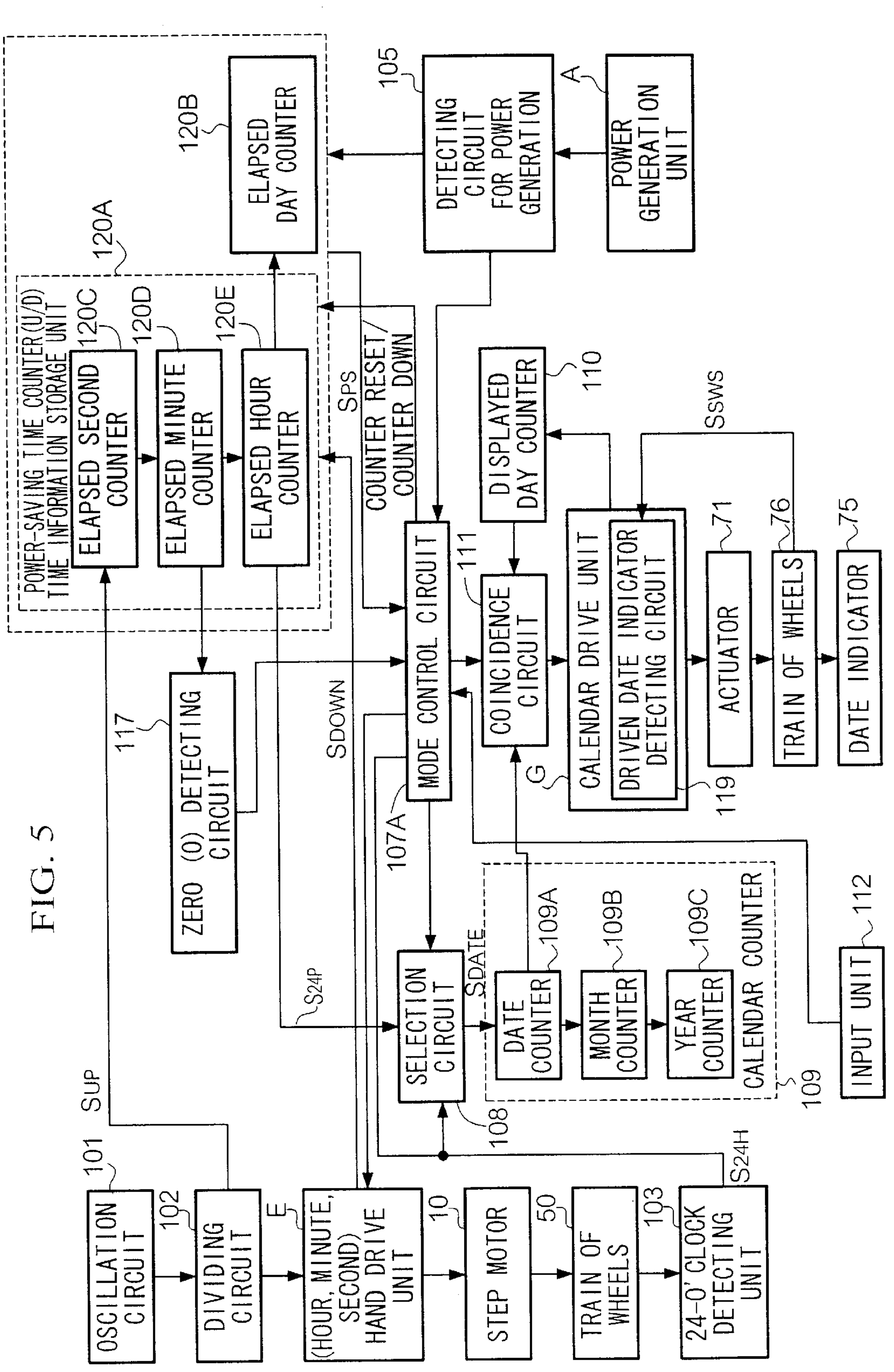
FIG. 5 is a functional block diagram showing a control unit C and its peripheral configuration according to a second embodiment.

The configuration of a control unit C in the time keeping apparatus according to the second embodiment of the present invention is explained with reference to FIG. 5. FIG. 5 is a functional block diagram showing the control unit C and connecting functional units. In FIG. 5, functional units identical to those in FIG. 2 according to the first embodiment use the same reference numbers.

In FIG. 5, differences from the first embodiment shown in FIG. 2 lie in that a non-generation time/power-saving mode elapsed time counter 120 is arranged in which the functions of the time information storage unit 104 are in part integrated with the non-generation time/power-saving mode elapsed time counter 106; and that the mode control circuit 107A is formed such that it operates based on the 24-o'clock detecting signal $S_{24H}$ provided by the 24-o'clock detecting unit 103 and a power-saving mode transferring signal $S_{PS}$ provided by the non-generation time/power-saving mode elapsed time counter 120 in cases when a non-generated elapsed time exceeds a specified time or the number of non-generation elapsed days exceeds the number of specified days at the power generation unit A.

Hereinafter, only the different functional units are described.

The non-generation time/power-saving mode elapsed time counter 120 placed in the control unit C is provided with, from a schematic viewpoint, a power-saving time counter 120A, an elapsed day counter 120B, an elapsed second counter 120C, an elapsed minute counter 120D, and an elapsed hour counter 120E.

During the power-saving mode, the power-saving time counter 120A receives the second clock signal $S_{CK1}$ as the count-up signal $S_{UP}$ to count a power-saving mode elapsed time, and outputs a 24-o'clock elapsed signal $S_{24P}$ every 24 hours. During a return from the power saving mode to the display mode, the counter 120A counts down on the count-down signal $S_{DOWN}$ from the drive unit E until the power-saving mode elapsed time becomes zero. Further, in the display mode, the counter 120A functions as part of the non-generation counter.

The elapsed day counter 120B is reset to zero when transferring to the power-saving mode and holds the reset state during the power-saving mode. Further, the counter 120B counts the number of non-generation elapsed days based on the output signals of both detecting circuit 105 and power-saving time counter 120A.

The elapsed second counter 120C receives a second clock signal $S_{CK1}$ as the count-up signal $S_{UP}$ to count up a power-saving time elapsed second during the power-saving mode. During a transfer from the power-saving mode to the display mode, the counter 120C counts down the power-saving time elapsed second on the count-down signal $S_{DOWN}$ supplied from the drive unit E.

The elapsed minute counter 120D counts up on a carrying-over signal from the elapsed second counter 120C during the power-saving mode. During a transfer from the power-saving mode to the display mode, the counter 120D counts down on a carrying-under from the elapsed second counter 120C.

The elapsed hour counter 120E counts up, during the power-saving mode, on a carrying-over signal issued from the elapsed minute counter 120D, and provides the 24-o'clock elapsed signal $S_{24P}$ at every 24 hours. Still, during a transfer from the power-saving mode to the display mode, the counter 120E counts down on a carrying-under signal supplied by the elapsed minute counter 120D.

The mode control circuit 107A performs control to transfer to the power-saving mode in cases not merely when the non-generation time/power-saving mode elapsed time counter 120 outputs the power-saving mode transferring signal $S_{PS}$ in response to an excess of the non-generation elapsed time over the specified time or an excess of the number of non-generation elapsed days over the specified number of days in the power generation unit A, but also the 24-o'clock detecting unit 103 outputs the 24-o'clock detecting signal $S_{24H}$ responsively to a displayed time which reaches the 24 o'clock (midnight).

That is, the mode control circuit 107A permits a transfer to the power-saving mode only when the non-generation elapsed time satisfies a given condition at the 24 o'clock.

This differs from the first embodiment. Although the power-saving mode cannot be moved to an arbitrary time by a user, it is possible to simplify the construction of the timer.

[2.2] Operation of Second Embodiment

Referring to FIGS. 4 and 1, a primary operation in the second embodiment is explained, in which operations similar to those in the first embodiment are omitted and not repeated here.

[2.2.1] Operation in the Display Mode

An operation in the display mode is almost identical to that in the first embodiment, thus identical parts will not be explained in detail.

The power-saving time counter 120A, which is placed in the non-generation time/power-saving mode elapsed time counter 120, serves as part of the non-generation time counter, in which a duration of a non-generation state is measured by the elapsed second counter 120C, elapsed minute counter 120D, and elapsed hour counter 120E, in cases when the detecting circuit 105 detects that the power generation unit A entered the non-generation state.

When the duration of the non-generation time is over 24 hours, the elapsed day counter 120B counts up using an output signal from the elapsed hour counter 120E.

In this situation, a display of the calendar is updated in cases when a duration counted by the elapsed time counter 120E is over a specified time or the number of days counted by the elapsed day counter 120B is over a specified number of days, and a displayed time reaches the 24 o'clock in the 24-o'clok detecting unit 103. After this, the mode control circuit 107A allows a transfer to the power-saving mode.

Figure 6:
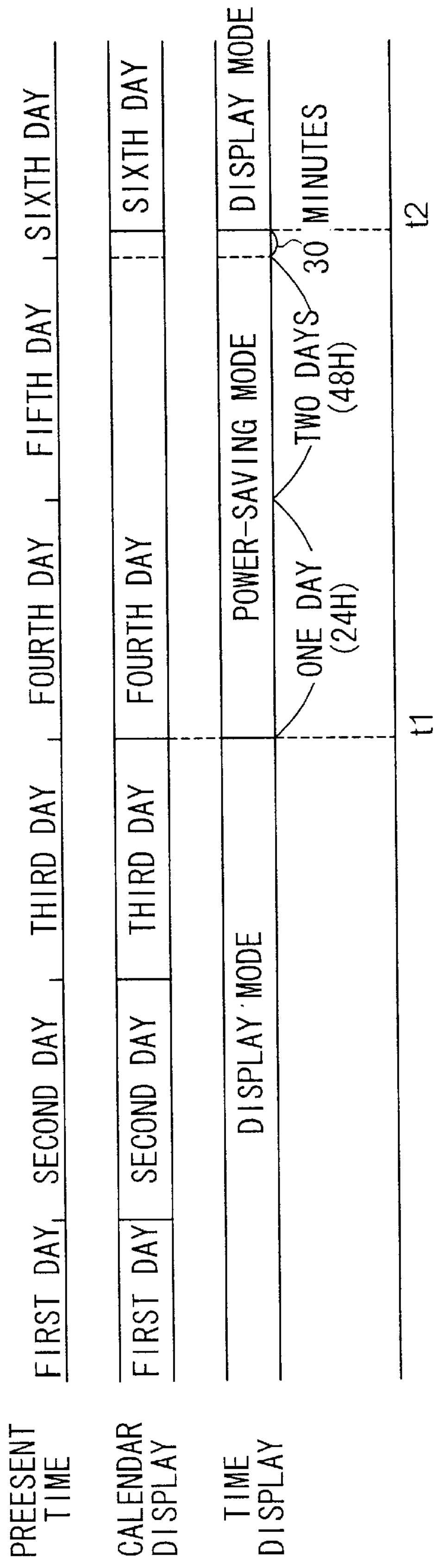
FIG. 6 is an operational illustration of the second embodiment.

Practically, as shown in FIG. 6, where, at time t1 when the calendar displays the "third day," a non-generated duration counted by the elapsed time counter 120E exceeds a specified time or the number of non-generation elapsed days counted by the elapsed day counter 120B exceeds a specified number of days, the display mode is kept to continue as it is, and the calendar display is updated at the midnight on the fourth day.

In other words, when the calendar drive unit G is controlled so that an alternating voltage is applied to the piezoelectric element of the actuator 71 of the calendar mechanism F to expand and retract the actuator in the lateral directions of FIG. 1, the rotor 72 is driven to be rotated. In response to the driven rotor 72, the date indicator controlling Geneva wheel 73 engaging with the rotor 72 is rotated, the date indicator driving wheel 74 is involved with the cam 73B of the wheel 73, and the date indicator 75 is driven, so that the calendar display is updated, before being transferred to the power-saving mode.

Though the present embodiment adopts only one date-driving cam 73B of the date indicator controlling Geneva wheel 73, another configuration can be adopted such that, for example, four cams are arranged at intervals of 90 degrees, providing a more efficient date driving operation.

[2.2.2] Operation in the Power-saving Mode

An operation in the power-saving mode is explained as follows.

In the power-saving mode, the oscillating circuit 101 of the control unit C outputs an oscillating signal to the dividing circuit 102, which then divides the outputted oscillating signal to produce various clock signals. These signals are supplied to both of the non-generation time/power-saving mode elapsed time counter 120 and the drive unit E.

However, the drive unit E stops displaying the time, if the operation mode has transferred to the power-saving mode by the control signal from the mode control circuit 107A. To be specific, the step motor 10 is brought to a non-driven state so that the display of the time is stopped.

This causes the 24-hours wheel 57 to stop, and the calendar drive unit G and the calendar mechanism F are stopped as well.

On the one hand, controlling the mode control circuit 107A allows the selection circuit 108 to selectively output to the calendar counter 109 the 24-hours elapsed signal $S_{24P}$ outputted from the elapsed hour counter 120E of the non-generation time/power-saving mode elapsed time counter 120, as the date counting signal $S_{DATE}$.

Accordingly, based on counted states of the time information storage unit 120A, the date counter 109A of the calendar counter 109 counts a day among the present year, month and, day. Thus, the calendar counter 109 counts the present year, month, and day on counted states of the non-generation time/power-saving mode elapsed time counter 120.

Additionally, in the non-generation time/power-saving mode elapsed time counter 120, the elapsed second counter 106C that composes the power-saving time counter 120A counts up a power-saving time elapsed second in response to the second clock signal $S_{CK1}$ serving as the count-up signal $S_{UP}$. Further, the elapsed minute counter 110D counts up on a carrying-over signal from the elapsed second counter 120C, and the elapsed hour counter 120E counts up on a carrying-over signal from the elapsed minute counter 120D.

As a result, an elapsed time of the power-saving mode is stored into the power-saving time counter 120A of the non-generation time/power-saving mode elapsed time counter 120.

[2.2.3] Operation in the Return to the Present Time

An operation during a return to the present time is explained as follows.

When the power generation unit A generates power having a voltage over a specified value and that lasts for at least a predetermined period of time, the generation is detected by the detecting circuit 105. In such case, the mode control circuit 107A performs a return to the display of the present time in order to transfer the operation mode from the power-saving mode to the display mode.

That is, the mode control circuit 107A drives and controls in a quick moving manner the second hand 61, minute hand 62 and hour hand 63 via the drive unit E and step motor 10 until the zero detecting circuit 117 detects that the time information storage unit 120A counts zero, so that a time displayed at present returns to the present time.

In detail, the drive unit E outputs a count-down signal $S_{DOWN}$ every time when a driving pulse toward the second hand 61 is output, making the count of the power-saving time counter 120A count down.

Responsive to this, the elapsed second counter 120C counts down on the count-down signal $S_{DOWN}$ provided from the drive unit E, the elapsed minute counter 120D counts down according to a carrying-under signal provided from the elapsed second counter 120C, and the elapsed hour counter 120E counts down according to a carrying-under signal provided from the elapsed minute counter 110.

This causes the power-saving time counter 120A to provide the zero detecting circuit 117 with the counts.

Accordingly, until the counts of the power-saving time counter 120A become zero in the zero detecting circuit 117, that is, by a period of time that has passed under the power-saving mode, the second hand 61, minute hand 62, and hour hand 63 are driven, a time displayed at present shows the present time.

Next, to return the calendar display, the coincidence circuit 111 is placed into operation.

This permits the coincidence circuit 111 to compare a count of the date counter 109A with a count of the display day counter 110.

Therefore, in cases when the operation mode has been in the power-saving mode state for one or more days, counts of both of the date counter 109A and the display day counter 110 are not identical to each other. Through the calendar drive unit G, the actuator 71 is driven, the rotor 72, the date indicator controlling Geneva wheel 73, and the date indicator driving wheel 74 all composing the wheel train 76 are rotated, and the date indicator 75 is rotated, thereby updating a calendar displayed at present.

When the incidence circuit 111 detects that counts of both date counter 109A and display day counter 110 equal each other, the calendar drive unit G stops its operation, thus the calendar displays the present calendar's date.

The mode control circuit 107A then controls the selection circuit 108 on a mode selecting signal $S_{MSEL}$, and the selection circuit 108 selectively outputs to the calendar counter 109 a 24-hours detecting signal $S_{24H}$, as the date counting signal $S_{DATE}$, output from the 24-o'clock detecting unit 103.

More practically, as shown in FIG. 6, at time t2 when forty-eight and half hours have passed since a transfer to the power-saving mode, a return to the present time is made by setting the time forward by 30 minutes and the calendar display is set to "the sixth day" by driving the calendar by two days.

[2.3] Effect of Second Embodiment

As described above, according to the present second embodiment, during the display mode, the calendar is displayed based on the operations of the 24-o'clock detecting unit interlocking with hand drives. During the display mode in the case a non-generation state at the power generation unit continues for at least a predetermined period of time, a transfer to the power-saving mode is made and the hand drives are stopped. Further, during the power-saving mode, the calendar counter to return to the calendar display is controlled in correspondence with an elapsed time of the power-saving mode. When returning the operation, the calendar can return its displays on the basis of a count of the calendar counter.

In this case, because the timing at which a transfer to the power-saving mode is made is always set to a given time obtained after 24 hours, it is not required to detect the present time when a transfer to the power-saving mode is made (as the time is always fixed), with the system configuration simplified, with ease of use to users improved, power-saving efficiency raised, and a driving duration of the time keeping apparatus elongated effectively. The hands in the power-saving mode always display the 12 o'clock, which is nice-looking and allows users to recognize easily that it is now in the power-saving mode.

Further, as to the calendar, its display returns to the present calendar's date. As a result, compared to time keeping apparatuses that require users to correct the display of a calendar by hand, the users labor for correcting the calendar display is reduced, improving ease of use to users.

[2.4] First Modification of Second Embodiment

A first modification of the second embodiment is explained.

The foregoing second embodiment has been explained with reference to a configuration in which a user is unable to set a transfer time of the power-saving mode at an arbitrary time. In contrast, a first modification of the second embodiment provides a configuration in which a user is able to set a transfer time of the power-saving mode through instructions such as an operation toward the input unit 112 including a crown.

[2.4.1] Operation of first Modification of Second Embodiment

Figure 7:
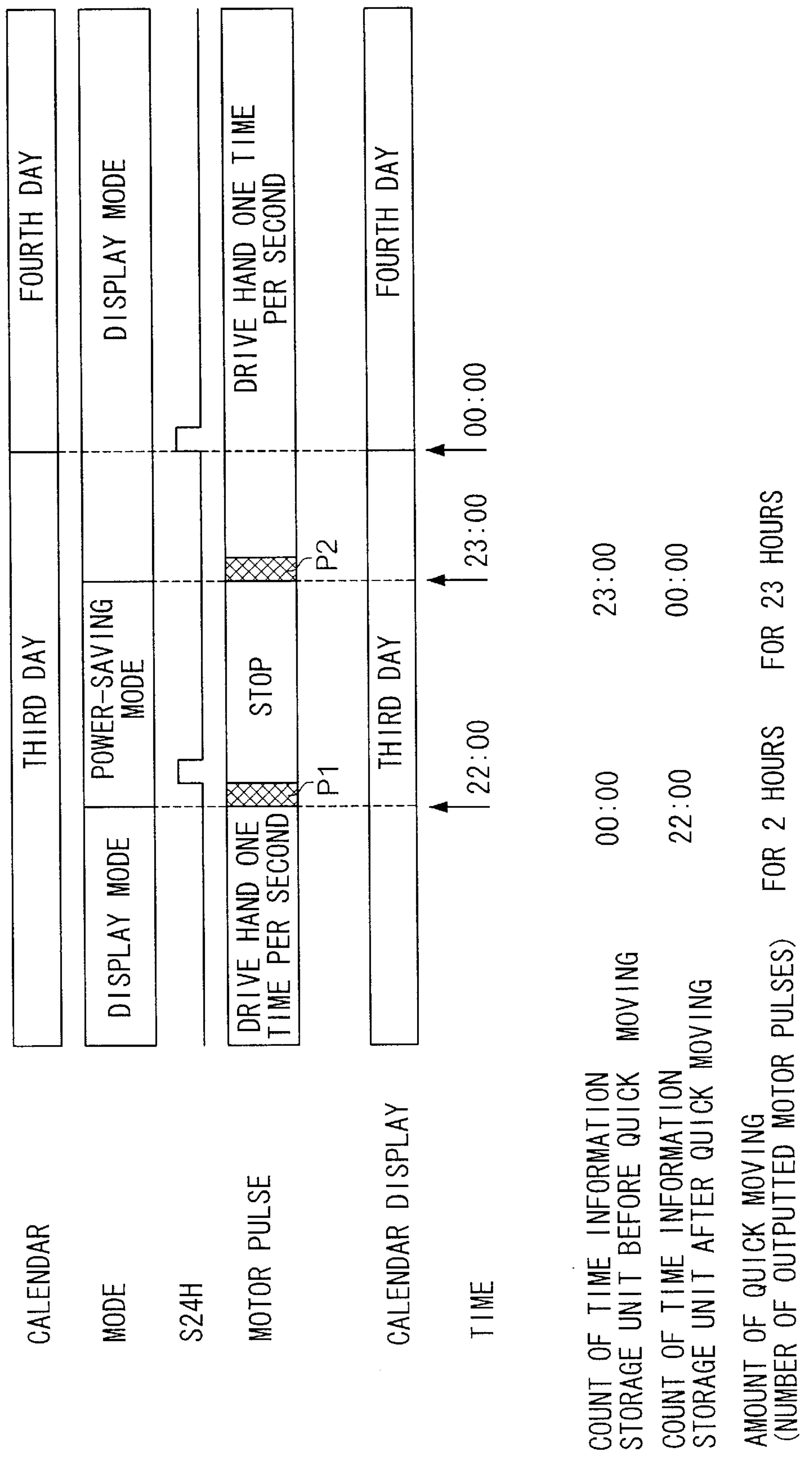
FIG. 7 is a first timing chart showing a first modification of the second embodiment.

[2.4.1.1] In the Case that Transfer to Power-saving Mode and Re-transfer to Display Mode are Performed in the Same Day FIG. 7 shows a first timing chart of the first modification. The timing chart shows a transfer to the power-saving mode at 22:00 on the third day by a user's instruction, which is followed by a return to the present time at 23:00 on the third day.

As shown in FIG. 7, when a user performs a predetermined action with the input unit 112 at 22:00 on the third day (for example, pulling out a crown from the zero-step position to the first-step pulled position, then pushing it back into the zero-step position within a given time (for instance, within one second)), a transfer to the power-saving mode is launched.

Practically, each of the counters 120C to 120E, which compose the time information storage unit 120A, is reset.

Then the drive unit E outputs a quick drive pulse to the step motor 10 on the basis of the signals given by the mode control circuit 107A (in FIG. 7, refer to a reference P1).

The drive unit E outputs one count-down signal $S_{DOWN}$ to the elapsed second counter 120C every time when outputting one quick drive pulse.

As a result, the time information storage unit 120A gradually memorizes by counting a value corresponding to a difference between the present time and a time displayed at present.

On one hand, when the quick drive pulse is provided from the drive unit E, the wheel train 50 is driven in parallel with the foregoing counting. When a displayed time reaches 24:00 (i.e., the processing shown by the reference P1 ends), a 24-o'clock detecting signal $S_{24H}$ is detected by the 24-o'clock detecting unit 103, then provided to the mode control circuit 107A.

In response, the mode control circuit 107A instructs the drive unit E to stop the quick drive pulse from outputting, thus being transferred to the power-saving mode.

The selection circuit 108 is controlled not to select the 24-o'ckock detecting signal $S_{24H}$ output from the 24-o'clock detecting unit 103, thus the date counting signal $S_{DATE}$ being not output. A count of the calendar counter 109 will not therefore be updated at this timing (in FIG. 7, "the third day" is kept).

On entering the power-saving mode, the time information storage unit 120A counts up responsively to the count-up signal $S_{UP}$, during which time, when the count becomes a value that corresponds to the midnight (24 o'clock), a 24-hours elapsed signal $S_{24P}$ is output from the elapsed time counter 120E to the selection circuit 108. The signal $S_{24P}$ is selected by the selection circuit 108, then output to the date counter 109A as the date counting signal $S_{DATE}$.

The other operations in the power-saving mode are identical to those in the foregoing second embodiment.

If the detecting circuit 105 detects at 23:00 that electric power having a voltage over a given value has been generated continuously for at least a given period of time in the power generation unit A, the mode control circuit 107A performs a return to the display of the present time, that is, the operation mode is transferred from the power-saving mode to display mode (in the figure, refer to a reference P2).

The other operations in returning to the present time display are identical to those in the foregoing second embodiment.

Figure 8:
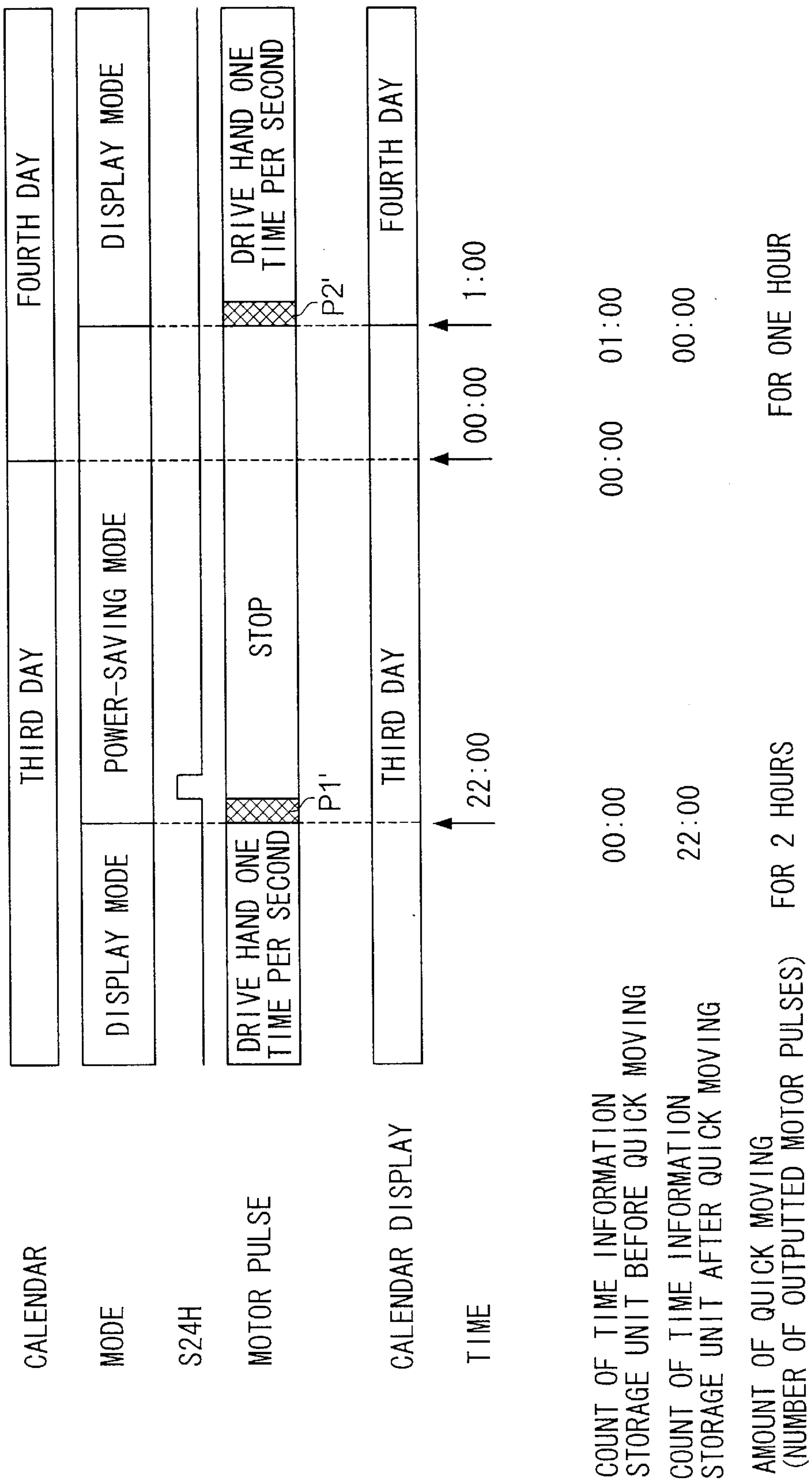
FIG. 8 is a second timing chart showing a first modification of the second embodiment.

[2.4.1.2] In the Case that Transfer to Power-saving Mode and Re-transfer to Display Mode are Performed in Different Days FIG. 8 shows a second timing chart of the first modification. The timing chart shows a transfer to the power-saving mode at 22:00 on the third day by a user's instruction, which is followed by a return to the present time at 1:00 on the fourth day.

As shown in FIG. 8, when a user performs a predetermined action with the input unit 112 at 22:00 on the third day (for example, pulling out a crown from the zero-step position to the first-step pulled position, then pushing it back into the zero-step position within a given time (for instance, within one second)), a transfer to the power-saving mode is launched.

Practically, each of the counters 120C to 120E, which compose the time information storage unit 120A, is reset.

Then the drive unit E outputs a quick drive pulse to the step motor 10 on the basis of the signals given by the mode control circuit 107A (in FIG. 8, refer to a reference P1').

The drive unit E outputs one count-down signal $S_{DOWN}$ to the elapsed second counter 120C every time when outputting one quick drive pulse.

As a result, the time information storage unit 120A gradually memorizes by counting a value corresponding to a difference between the present time and a time displayed at present.

When the quick drive pulse is provided from the drive unit E, the wheel train 50 is driven in parallel with the foregoing counting. When a displayed time reaches 24:00 (i.e., the processing shown by the reference P1' ends), a 24-o'clock detecting signal $S_{24H}$ is detected by the 24-o'clock detecting unit 103, then provided to the mode control circuit 107A.

In response, the mode control circuit 107A instructs the drive unit E to stop the quick drive pulse from outputting, thereby being transferred to the power-saving mode.

The selection circuit 108 is controlled not to select the 24-o'ckock detecting signal $S_{24H}$ output from the 24-o'clock detecting unit 103, thus the date counting signal $S_{DATE}$ is not outputted. A count of the calendar counter 109 will not therefore be updated at this timing (in FIG. 8, "the third day" is kept).

On entering the power-saving mode, the time information storage unit 120A counts up responsively to the count-up signal $S_{UP}$, during which time, when the count becomes a value that corresponds to midnight (24 o'clock), that is, 00:00 on the fourth day, a 24-hours elapsed signal $S_{24P}$ is output from the elapsed time counter 120E to the selection circuit 108. The signal $S_{24P}$ is selected by the selection circuit 108, then output to the date counter 109A as the date counting signal $S_{DATE}$. Therefore, at this time, a count of the calendar counter 109 is updated (in FIG. 8, it is on "the fourth day.")

The other operations in the power-saving mode are identical to those in the foregoing second embodiment.

If the detecting circuit 105 detects at 01:00 on the fourth day that electric power having a voltage over a given value has been generated continuously for at least a given period of time in the power generation unit A, the mode control circuit 107A performs a return to the display of the present time, that is, the operation mode is transferred from the power-saving mode to display mode (in the figure, refer to a reference P2'), and further performs a return of the calendar so as to display the fourth day.

The other operations in returning to the present time display are identical to those in the foregoing second embodiment.

[2.4.2] Effect of First Modification of Second Embodiment

As stated above, according to the first modification of the second embodiment, in addition to the effects obtained with the foregoing embodiment, a user is able to set a transfer time of the power-saving mode at an arbitrary time through instructions. Moreover, the hour and minute hands (additionally, the second hand) are always located at the position of 12 o'clock (24 o'clock position) during the power-saving mode, which is nice-looking. This also allows a user to easily recognize that the time keeping apparatus is in the power-saving mode, so that the user does not worry about the time keeping apparatus stopping due to running out of a battery, and other similar concerns.

[2.5] Second Modification of Second Embodiment

A second modification of the second embodiment is described.

This second modification explains another technique of returning the calendar to the present day display.

[2.5.1] Operation of Second Modification

Figure 9:
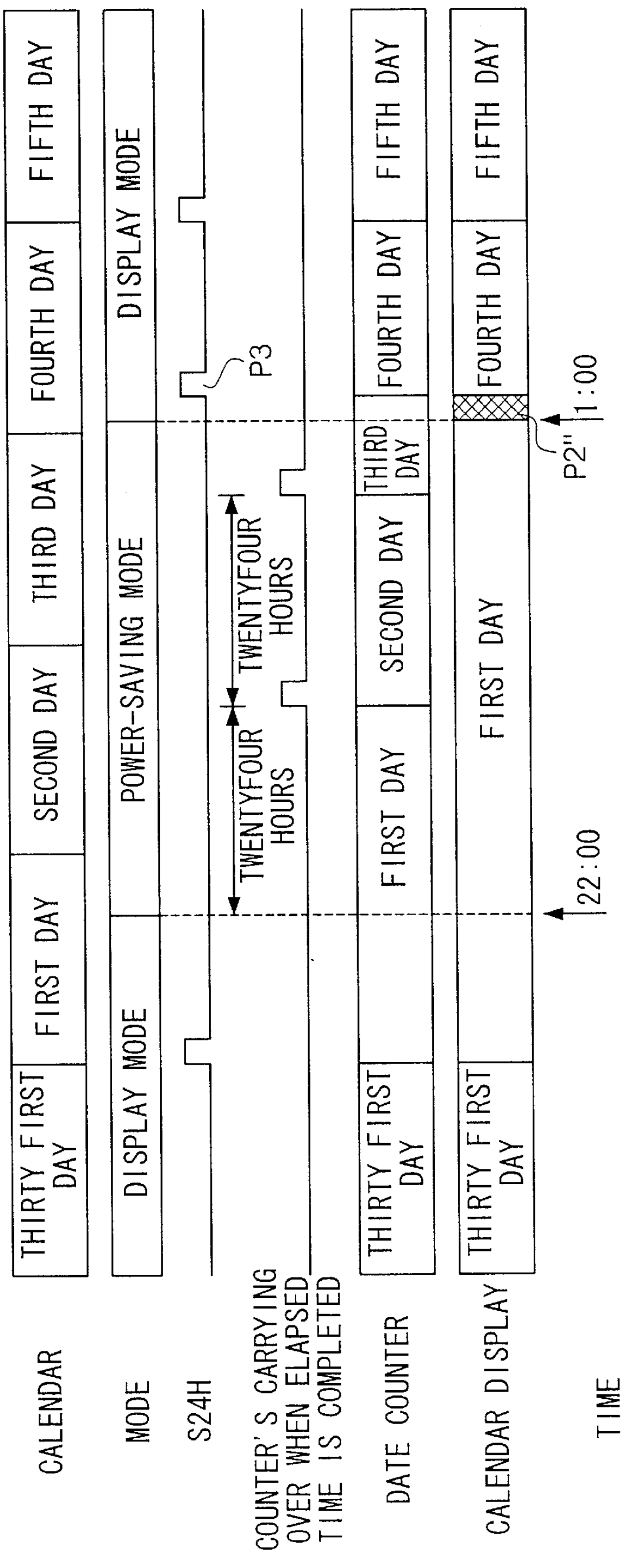
FIG. 9 is a timing chart showing a second modification of the second embodiment.

FIG. 9 shows a timing chart of the second modification. This timing chart shows a transfer to the power-saving mode at 22:00 on the first day by a user's instruction, which is followed by a return to the present time at 1:00 on the fourth day.

After the transfer to the power-saving mode on an user's instruction at 22:00 on the first day, the elapsed second counter 120C, which composes the power-saving time counter 120A of the non-generation time/power-saving mode elapsed time counter 120, counts up a power-saving time elapsed second in response to the second clock signal $S_{CK1}$ input as the count-up signal $S_{UP}$. Further, the elapsed minute counter 120D counts up on a carrying-over signal from the elapsed second counter 120C, and the elapsed hour counter 120E counts up on a carrying-over signal from the elapsed minute counter 120D.

As a result, an elapsed time of the power-saving mode is stored into the power-saving time counter 120A of the non-generation time/power-saving mode elapsed time counter 120.

The time information storage unit 120A counts up responsively to the count-up signal $S_{UP}$, during which time, when the count becomes a value that corresponds to midnight (24 o'clock), a 24-hours elapsed signal $S_{24P}$ is output from the elapsed time counter 120E to the selection circuit 108. The signal $S_{24P}$ is selected by the selection circuit 108, then output to the date counter 109A as the date counting signal $S_{DATE}$. Accordingly, at this timing, a count of the calendar counter 109 is updated, and a value of one (corresponding to one day) is added to the count.

The other operations in the power-saving mode are identical to those in the foregoing second embodiment.

If the detecting circuit 105 detects at 01:00 on the fourth day that electric power having a voltage over a given value has been generated continuously for at least a given period of time in the power generation unit A, the mode control circuit 107A performs a return to the display of the present time, that is, the operation mode is transferred from the power-saving mode to display mode (in the figure, refer to a reference P2'), thereby the hour and minute hands (and the second hand) are driven quickly.

In response to one quick drive pulse, the count-down signal $S_{DOWN}$ is output, and a count of the time information storage unit 120A is counted down one by one.

When the count of the time information storage unit 120A reduces down to zero, the quick drive is stopped.

During the quick drive process of the foregoing hour and minute hands and others, the 24-hours detecting signal $S_{24H}$ is outputted, as shown by a reference P3 in FIG. 9, the 24-hours detecting signal $S_{24H}$ is supplied to the date counter 109A via the selection circuit 108. A count of the date counter 109A is increased by one, thereby becoming 3 (=2+1).

After a return to the display of the present time, the display is quickly driven from the first day to the fourth day (=one day+three days) based on the count of the date counter 109A (in the figure, refer to a reference P"), thereby the calendar display the fourth day.

The other operations in the return to the display of the present time are identical to those in the foregoing second embodiment.

[2.5.2] Effect of Second Modification of Second Embodiment

As described above, the present second modification provides a more secure return to display the calendar.

[3] Variations of Embodiment

[3.1] First Variation

Figure 10:
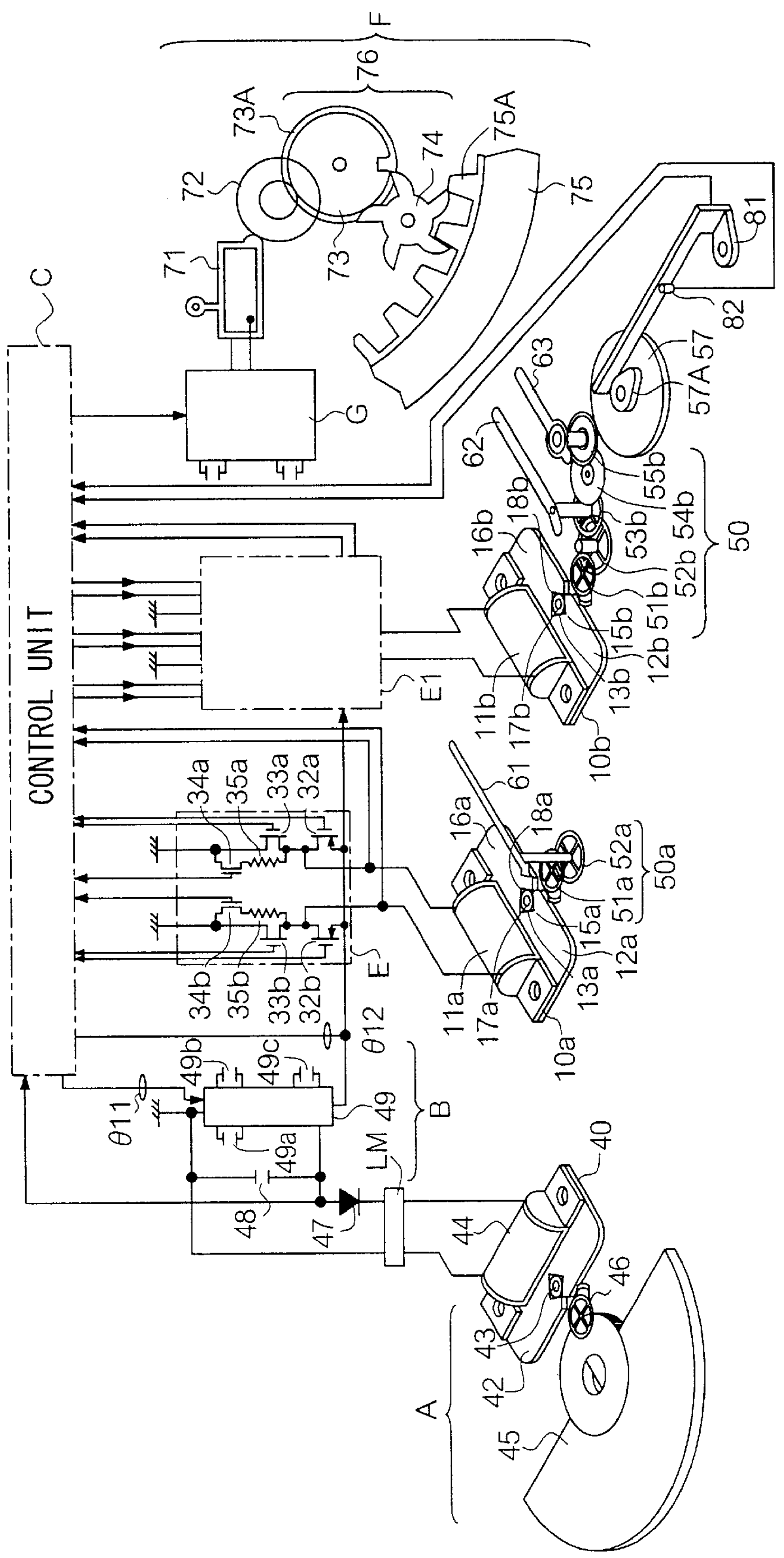
FIG. 10 outlines a configuration of a time keeping apparatus according to the first variation.

Although the above has been described with a configuration in which the second hand 61, minute hand 62, and hour hand 63 are driven by the same step motor, a two-motor system can also be applied to the present invention, in which, as shown in FIG. 10, the second hand 61 is driven by one step motor 10*a*, while the minute and hour hands 62 and 63 are driven the other step motor 10*b*.

In this configuration, the 24-hours wheel 57 may be driven through the wheel train 50*b* arranged to one side of step motor 10*b*.

In this configuration, a non-generation state duration during which each display of the second, hour and minute, and calendar is transferred from the display mode to the power-saving mode can be specified separately.

For example, the second display can be transferred to the power-saving mode at a time when the non-generation state duration reaches one hour, the hour and minute displays can be transferred to the power-saving mode at time when the non-generation state duration reaches 24 hours, and the calendar display can be transferred to the power-saving mode at a time when the non-generation state duration reaches 31 days.

In this case, the order of return to the display mode can be set to the hour and minute display, to the second display, and to the calendar display, or, the hour and minute display, to the calendar display, and to the second display. This order enables ease of use to be improved, because the hour and minute, which are most desired by users, return first.

Further, in the case that it takes one or more seconds to perform a return of the calendar display, it is preferred to set a return order of the hour and minute display, to the calendar display, and to the second display. Since this avoids each recovering operation from being overlapped temporally, control can be simplified and dynamic stability of each recovering operation can be enhanced.

Figure 11:
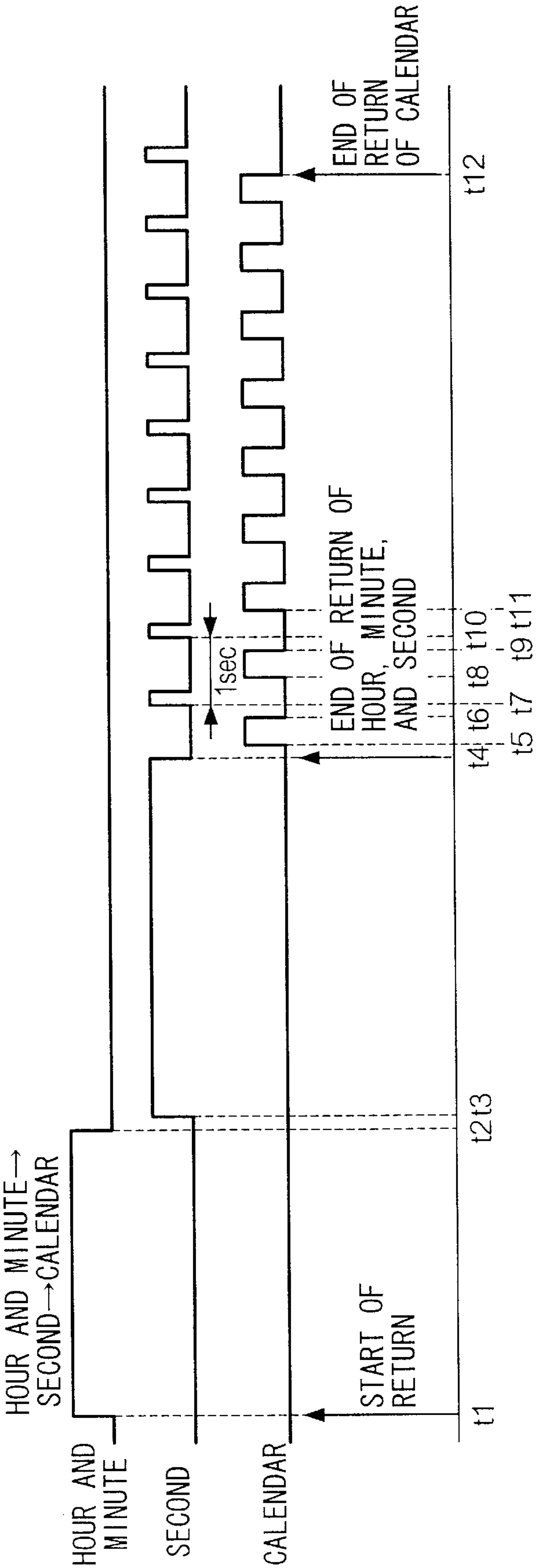
FIG. 11 illustrates a detailed operation in the case that a return is made in the order of an hour and minute display, a second display, and to a calendar display in the first variation.

[3.1.1] Detailed Operation in the Case that Returns are Made in the Order of Hour and Minute Display, to Second Display, and to Calendar Display As to the case that returns to the display mode are made in the order of the hour and minute display, to the second display, and to the calendar display, a detailed operation will now be described with reference to FIG. 11.

On starting a return to the present time at time t1, return of the hour and minute hands first start (quick drives of the hour and minute hands), thereby hour/minute drive pulses being are output successively.

The return processing of the hour and minute hands is completed at time t2, being transferred to a normal operation. Then, a return of the second hand (a quick drive of the second hand) is started at time t3, thereby second drive pulses are output successively.

Then, the return processing of the second hand is completed at time t4, and the return processing of the hour, minute, and second being are completed, thus entering a normal operation in which the second hand drive pulses are output every one second. During an interval where no second hand drive pulse is output and a calendar drive pulse is output, at time t5 at which no second hand drive pulse is output, return processing of the calendar (a quick drive of the date indicator) is started, and a date indicator drive pulse is started to be output.

Then, at time t6, the date indicator drive pulse is temporarily interrupted from being output so as not to have an influence on the output of the second hand drive pulse.

Then, at time t7, the second hand drive pulse is output for only one second, driving the second hand.

Then, at time t8, a return of the calendar (a quick drive of the date indicator) is re-started and a date indicator drive pulse is re-started to be output.

After this, at time t9, the date indicator drive pulse is temporarily interrupted from being output so as not to have an influence on the output of the second hand drive pulse.

Then, at time t10, the second hand drive pulse is output for only one second, driving the second hand.

After time t11, like the above, each date indicator drive pulse is repeatedly output at a time so as not to influence the second hand drive pulse output every one second. And at time t12, the return processing of the calendar is completed.

Such a configuration allows information on hour and minute, which seems to most concern users, to undergo the first return processing. This improves utility of the device.

Further, prior to the return processing of the calendar, the return processing of hour and minute, and second is completed quickly. A user can have an impression that the return of time is speedy, and can feel that the apparatus is excellent in ease of use.

Although the above configuration is described with the date indicator drive pulse repeatedly output at a time not to influence the second hand drive pulse to be output, it is required that the date indicator drive pulse be output at time not to influence the hour and minute hand drive pulse to be output.

Figure 12:
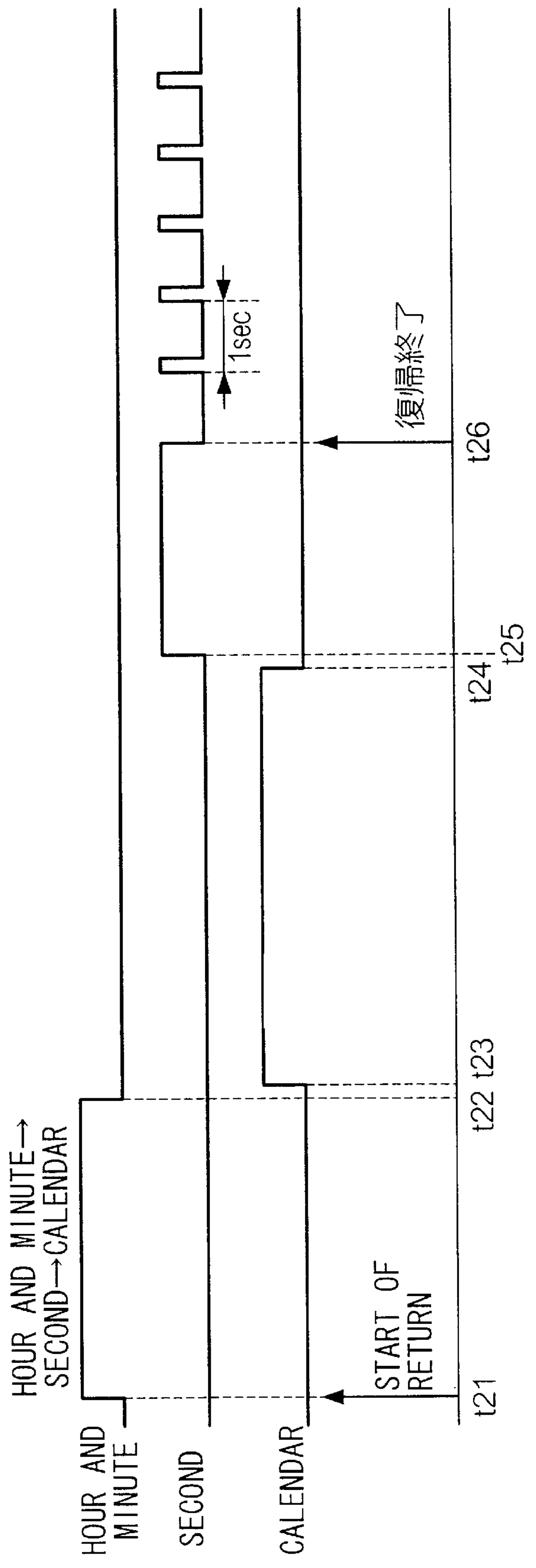
FIG. 12 illustrates a detailed operation in the case that a return is made in the order of an hour and minute display, a calendar display, and to a second display in the first variation.

[3.1.2] Detailed Operation in the Case that Returns are Made in the Order of Hour and Minute Display, to Calendar Display, and to Second Display As to the case that returns to the display mode are made in the order of the hour and minute display, to the calendar display, and to the second display, a detailed operation will now be described with reference to FIG. 12.

On starting a return to the present time at time t21, returns of the hour and minute hands first start (quick drives of the hour and minute hands), thereby hour/minute drive pulses being outputted successively.

The return processing of the hour and minute hands is completed at time t22, being transferred to a normal operation. Then, a return of calendar (a quick drive of the date indicator) is started at time t23, thereby date indicator drive pulses being outputted successively.

Then, at time t24, the return processing of the calendar is completed, entering a normal operation of the calendar. And at time t25, a return of the second hand (a quick drive of the second hand) is launched, second hand drive pulses being output successively.

Then, at time t26, the return processing of the second hand is completed, and hereinafter, a normal operation is realized where the second hand drive pulse is output every one second.

Such a configuration allows information on hour and minute, which seems to most concern users, to undergo the first return processing. This improves utility of the device.

Additionally, because overlapping between the recovering operations and the normal operations is avoided, there is an advantage that control is easier to compare to the foregoing return orders of the hour and minute display, to second display, and to calendar display.

[3.2] Second Variation

In the above apparatus, the power generation unit has adopted a generation device where the oscillating weight is used to convert kinetic energy to electric energy. Instead of it, other generation devices, for example, photoelectric generators such as solar cells, thermoelectric generators such as thermocouples, and generators converting kinetic energy charged in a power spring to electric energy, can be used.

[3.3] Third Variation

Although the foregoing apparatus has been described in a manner that it has only the power generation unit in connection with a power system, the present invention is applicable to a time keeping apparatus in which a battery system, such as a primary battery, a secondary battery, or a large-capacity capacitor, is incorporated as a power source.

[3.4] Fourth Variation

Although the foregoing apparatus has been described in a manner that a state unused by users is detected by measuring a non-generated time, it is also possible to arrange a carried sate detecting device (used state detecting device) capable of detecting a carried state or a used state, which includes an acceleration sensor, a contact sensor, or a contact switch. Such a device can be used to detect the used state/unused state, which makes a transfer to the power-saving mode possible.

[3.5] Fifth Variation

In the foregoing description, the input unit 112 uses a crown as an external input member. An alternative is that a button can be used as the external input member or a detecting mechanism for power generation can be used instead of the external input member. Hence, detecting that the time keeping apparatus is shaken by hand makes it possible to automatically return the present time or the calendar's date.

Further, using an external input member enables direct return the present time or the calendar's date.

[3.6] Sixth Variation

In the foregoing description, the calendar mechanism F is configured such that the rotor 72 is rotationally driven by the actuator 71 having a piezoelectric element to which an alternating voltage is applied and being able to be expanded and retracted, thereby the date indicator 75 being driven. However, the present invention is not confined to this configuration. For example, the actuator 71 to rotationally driving the rotor 72 (or the date indicator controlling Geneva wheel) can be replaced by normally used drive means such as a step motor.

[7.3] Seventh Variation

Figure 13:
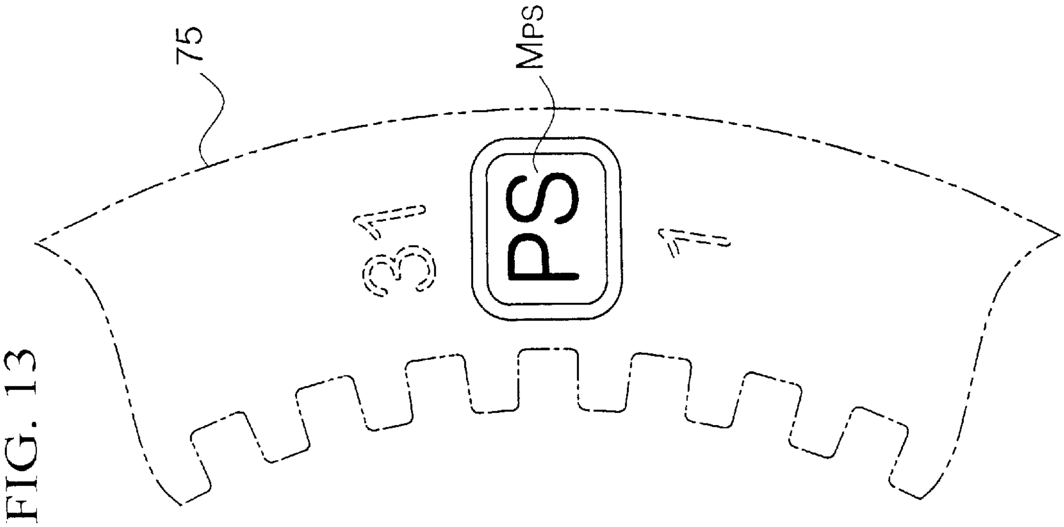
FIG. 13 shows an illustration of a time keeping apparatus according to a seventh variation.

In the foregoing description, during the power-saving mode, the calendar display unit continues to display a calendar date that was displayed just when entering the power-saving mode. However, as shown in FIG. 13, a mark $M_{PS}$ representing that the operation is in the power-saving mode may be printed on, for example, between the thirty-first day and the first day of the date indicator 75. This mark is displayed when entering the power-saving mode. In this case, any mark $M_{PS}$ can be used, unless a user confuses normally displayed calendar dates. That is, it is enough for the mark to show that it is not a calendar. Therefore, the mark includes a mode mark such as "PS (power saving)" or others, a logotype or character of a commodity, a color with no pattern or which is the same as a dial, or a material. Placing at the calendar display unit a mark showing that it is not a calendar makes it possible to avoid a misunderstanding between a displayed calendar date and the present calendar date during the power-saving mode. This clearly notifies a user that it is now in the power-saving mode.

Furthermore, in order to show that it is now in the power-saving mode, a second mark MPS can be printed between the fifteenth and sixteenth days of the date indicator 75 and displayed during the power-saving mode. According to this configuration, only half a rotation, at its maximum, of the date indicator 75 is enough to show the power-saving mode, thereby saving more residual energy.

[3.8] Eighth Variation

Figure 14:
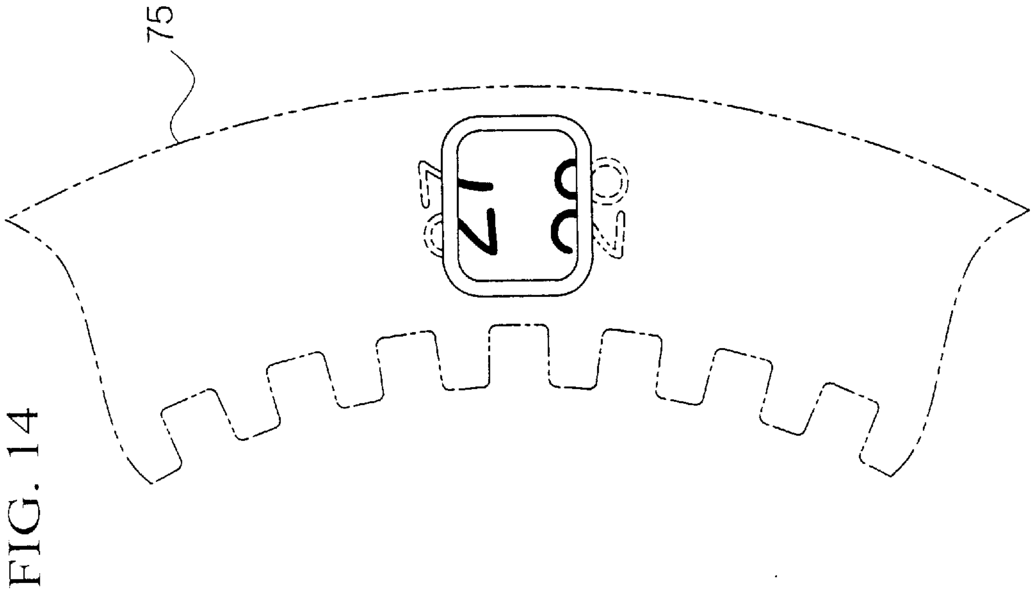
FIG. 14 shows an illustration of a time keeping apparatus according to an eighth variation.

In the foregoing description, during the power-saving mode, the calendar display unit continues to display a calendar date that was displayed just when entering the power-saving mode. Alternatively, in cases display the calendar enters the power-saving mode due to the fact that residual energy of the power source of a time keeping apparatus is reduced to a small amount, there can be provided another display where, as shown in FIG. 14, an intermediate display state in transferring from a first calendar display state (in FIG. 14, an display of the 27th day) to a second calendar display state (in FIG. 14, an display of the 28th day) is held. That is, the power-saving mode is displayed by stopping the calendar display at an intermediate position between two calendar displays, i.e. between two days. This display enables a user to not only recognize that the operation is in the power-saving mode but also suppose that the residual energy of the power source is small.

Therefore, the user can take actions to return a calendar display, such as replacing batteries or charging.

Compared to display of a particular mark as in the foregoing seventh variation, the eighth variation can reduce energy necessary for the drive.

[3.9] Ninth Variation

As described before, in the case of the wristwatch apparatus having the other function of display the calendar, the time display is performed for 72 hours (3 days) after entering a non-carrying condition, before transferring to the power-saving mode. This is able to take it into account a user who does not carry the wristwatch apparatus on weekends (from Friday night to Monday morning) and becomes almost free from a manual recovering operation for the calendar display. However, regardless of the fact that the apparatus is not in use, the power is consumed uselessly because of a continued calendar display.

In contrast, in the case of this embodiment, the calendar display can be returned automatically, which eliminates the necessity of a user's manual recovering operation. Thus, when entering a non-carrying condition and its condition lasts for at least a predetermined time, the power-saving mode is realized.

Preferably, the predetermined time is set to a period of time which is not so long in terms of a consumed power, for example, 72 hours, and not so short in terms of ease of use to users.

Practically, it seems that it is preferred to enter the power-saving mode if the non-carrying condition continues for 24 or more hours, in terms of power consumption and ease of use.

Further, if immediately entering the power-saving mode at a time when 24 hours have passed after a non-carrying condition started, a temporal instant at which a transfer is made to the power-saving mode does not become constant due to user's activity. There is a possibility that a user may misunderstand that there occurred a malfunction.

A countermeasure is that a transfer to the power-saving mode is made in cases not only a non-carrying condition continues for at least a predetermined period of time but also time reaches a predetermined temporal instant (i.e. time of day). According to this, a temporal instant at which a transfer to the power-saving mode is made is fixed, thereby time displayed during the power-saving mode being always fixed. It is therefore possible for a user to easily grasp a state in which the operation mode is in the power-saving mode, and the display becomes nice-looking during the power-saving mode.

As a practical example, it is preferred to determine the predetermined temporal instant as midnight.

[3.10] Tenth Variation

In the foregoing configuration, a duration of the non-carrying condition, which is measured until a transfer to the power-saving mode, has been preset, but another configuration is also possible in which a user arbitrarily selects any from a plurality of periods of time or a user set the duration arbitrarily.

Specifically, an operation button is arranged to set the duration or the duration is set through a specified operation with an external operation member such as a crown(+).

[3.11] Eleventh Variation

The foregoing is described as the recovering operation of the calendar of which date figures are handled as a single united display. Alternatively, if a displayed calendar includes a plurality of types of displays, such as a day, a day of the week, a month, and a year, and transmission systems are separately arranged for those types of displays, an alternative configuration is that those displays are returned in an arbitrary order considering ease of use.

Specifically, provided four types of displays, such as a day, a day of the week, a month, and a year, are included and transmission systems are arranged respectively, the calendar can be returned in the order of a day return, to a month return, to a return of a day of the week, and to a year return.

What is claimed is:

1. A time keeping apparatus having a display mode for displaying time and a power-saving mode for reducing power consumption, the time keeping apparatus comprising:

a time display unit for performing a time display;

a time detecting unit, which is interlocked with the time display unit, for outputting a time detection signal in cases where a displayed time reaches a predetermined time;

a calendar display unit for performing a calendar display in response to the time detection signal when the time keeping apparatus is operating in the display mode;

a display stopping unit for stopping, in the power-saving mode, both the time display and the calendar display;

a time information storage unit for storing information relating to an elapsed time of the power-saving mode; and a control unit for switching from the power saving mode to a display mode, the calendar display unit being responsive to switching to the display mode to control the calendar to display a present day on the basis of information relating to an elapsed time of the power-saving mode stored in the time information storage unit.

2. A time keeping apparatus of claim 1, wherein the calendar display includes at least one of date display, day of week display, month display, and year display.

3. A time keeping apparatus of claim 1, wherein the time information storage unit stores present time information based on the time detection signal in the display mode.

4. A time keeping apparatus of claim 1, wherein said control unit is responsive to the calendar display unit updating the calendar display for switching from the display mode to the power-saving mode.

5. A time keeping apparatus of claim 1, further comprising a date storage unit for storing a present date and for updating the present date based on information relating to an elapsed time of the power-saving mode stored in the time information storage unit.

6. A time keeping apparatus of claim 1, wherein said control unit, when switching from the power saving mode to the display mode, controls the time display unit to return to the present time and then controls the calendar display unit to display the present day.

7. A time keeping apparatus of claim 1, wherein the time display unit includes an hour and minute display unit for displaying an hour and minute and a second display unit for displaying a second, and wherein said control unit, when switching from the power saving mode to the display mode, controls the hour and minute display unit to return to the present time, and then controls the calendar display unit to display the present day, and then controls the second display unit to display the present time.

8. A time keeping apparatus of claim 1, wherein the time display unit includes an hour and minute display unit for displaying an hour and minute and a second display unit for displaying a second, and wherein said control unit, when switching from the power saving mode to the display mode, controls the hour and minute display unit to return to the present time, and then controls the second display unit to display the present time, and then controls the calendar display unit to display the present day.

9. A time keeping apparatus of claim 1, further comprising a power generating unit for generating electric power to drive the time keeping apparatus.

10. A time keeping apparatus of claim 9, wherein the power generating unit comprises one of an electromagnetic induction generator, a photoelectric conversion generator, and a thermoelectric conversion generator.

11. A time keeping apparatus of claim 9, further comprising:

a use-state determining unit for determining whether or not the time keeping apparatus is being used by monitoring whether the power generating unit is generating; and the control unit is responsive to the use-state determining unit determining that the time keeping apparatus is not being used for switching to the power saving mode.

12. A time keeping apparatus of claim 11, wherein the control unit switches to the power-saving mode when the time keeping apparatus remains unused for at least a predetermined period of time after the use-state determining unit first determines that the time keeping apparatus is not being used.

13. A time keeping apparatus of claim 12, wherein the predetermined period of time is 24 hours.

14. A time keeping apparatus of claim 11, wherein the control unit switches to the power-saving mode and stops the time display of the time display unit when the time keeping apparatus remains unused for at least a first predetermined period of time after the use-state determining unit first determines that the time keeping apparatus is not being used, and wherein the control unit switches to the power-saving mode and stops the calendar display of the calendar display unit when the time keeping apparatus remains unused for at least a second predetermined period of time after the use-state determining unit first determines that the time keeping apparatus is not being used.

15. A time keeping apparatus of claim 11, wherein the time display unit includes an hour and minute display unit for displaying an hour and minute and a second display unit for displaying a second, and the control unit switches to the power-saving mode and stops the hour and minute display of the time display unit when the time keeping apparatus remains unused for at least a first predetermined period of time after the use-state determining unit first determines that the time keeping apparatus is not being used, and wherein the control unit switches to the power-saving mode and stops the second display of the time display unit when the time keeping apparatus remains unused for at least a second predetermined period of time after the use-state determining unit first determines that the time keeping apparatus is not being used.

16. A time keeping apparatus of claim 1, further comprising:

a use-state determining unit for determining whether or not the time keeping apparatus is being used; and the control unit is responsive to the use-state determining unit determining that the time keeping apparatus is not being used for switching to the power saving mode.

17. A time keeping apparatus of claim 16, wherein the control unit switches to the power-saving mode when the time keeping apparatus remains unused for at least a predetermined period of time after the use-state determining unit first determines that the time keeping apparatus is not being used.

18. A time keeping apparatus of claim 16, wherein the control unit switches to the power-saving mode when the time keeping apparatus remains unused for at least a predetermined period of time and a predetermined time of day is passed after the use-state determining unit first determines that the time keeping apparatus is not being used.

19. A time keeping apparatus of claim 18, wherein the predetermined period of time is twenty-four hours.

20. A time keeping apparatus of claim 18, wherein the predetermined time of day is midnight.

21. A time keeping apparatus of claim 1, further comprising an operating unit for performing a plurality of operations, and wherein said control unit is responsive to one of said operations for switching to said power-savings mode.

22. A time keeping apparatus of claim 1, further comprising:

a use-state determining unit for determining whether or not the time keeping apparatus is being used; and the control unit is responsive to the use-state determining unit determining that the time keeping apparatus is not being used for switching to the power saving mode; and wherein the control unit switches to the power-saving mode and stops the time display of the time display unit when the time keeping apparatus remains unused for at least a first predetermined period of time after the use-state determining unit first determines that the time keeping apparatus is not being used, and wherein the control unit switches to the power-saving mode and stops the calendar display of the calendar display unit when the time keeping apparatus remains unused for at least a second predetermined period of time after the use-state determining unit first determines that the time keeping apparatus is not being used.

23. A time keeping apparatus of claim 1, further comprising an operating unit for performing a plurality of operations, and wherein said control unit is responsive to one of said operations for switching to the display mode from the power-savings mode.

24. A time keeping apparatus of claim 1, wherein the calendar display unit performs the calendar display on the basis of the time detection signal in the display mode, and on the basis of information relating to an elapsed time of the power-saving mode stored in the time information storage unit when the control unit switches to the display mode from the power-saving mode.

25. A time keeping apparatus of claim 1, wherein the calendar display unit performs a non-calendar display showing that the calendar display has been stopped in the power-saving mode.

26. A time keeping apparatus of claim 25, wherein when the calendar display unit performs a non-calendar display, the calendar displays an intermediate state between display of one day and another day.

27. A time keeping apparatus of claim 1, wherein the calendar display unit performs a non-calendar display showing that the calendar display has been stopped due to a residual energy amount of electric power serving as a drive source of the time keeping apparatus becoming less than a predetermined residual energy amount.

28. A time keeping apparatus of claim 27, when the calendar display unit performs a non-calendar display, the calendar displays an intermediate state between display of one day and another day.

29. A method for controlling a time keeping apparatus comprising (a) a time display device for displaying time, (b)

a time detecting unit, which is interlocked with the time display device, for outputting a time detection signal in cases where a displayed time reaches a predetermined time, and (c) a calendar display device for displaying a present date in response to the time detection signal when the time keeping apparatus is operating in the display mode, and having a display mode in which the present time and present day are displayed, and a power-saving mode to reduce power consumption, the method comprising the steps of:

stopping both the time display and the calendar display in the power-saving mode;

measuring an elapsed time of the power-saving mode and storing information relating to the elapsed time; and switching from the power-saving mode to the display mode and concurrently updating the calendar display to the present day on the basis of information.

* * * * *

UNITED STATES PATENT AND TRADEMARK OFFICE

CERTIFICATE OF CORRECTION

PATENT NO. : 6,766,459 B2
DATED : July 29, 2004
INVENTOR(S) : Noriaki Shimura et al.

It is certified that error appears in the above-identified patent and that said Letters Patent is hereby corrected as shown below:

Title page,
Item [54], Title, change "TIME KEEPING APPARATUS AND METHOD FOR CONTROLLING THE SAME" to -- A TIME KEEPING METHOD AND APPARATUS FOR CONTROLLING A CALENDAR DISPLAY BASED ON THE DETECTION OF A PREDETERMINED TIME AND THE CURRENT POWER CONSUMPTION MODE --.

Column 24,
Line 27, change "a" to -- the --.
Line 30, change "an" to -- the --.

Signed and Sealed this

Twelfth Day of October, 2004

JON W. DUDAS
*Director of the United States Patent and Trademark Office*